United States Patent
Faith et al.

(10) Patent No.: US 9,489,674 B2
(45) Date of Patent: Nov. 8, 2016

(54) FREQUENCY-BASED TRANSACTION PREDICTION AND PROCESSING

(75) Inventors: Patrick Faith, Pleasanton, CA (US); Kevin P. Siegel, Milpitas, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 12/773,770

(22) Filed: May 4, 2010

(65) Prior Publication Data

US 2010/0280882 A1 Nov. 4, 2010

Related U.S. Application Data

(60) Provisional application No. 61/175,381, filed on May 4, 2009.

(51) Int. Cl.
*G06Q 10/06* (2012.01)
*G06Q 30/02* (2012.01)
*G06Q 10/04* (2012.01)
*G06Q 20/40* (2012.01)
*G06Q 40/00* (2012.01)

(52) U.S. Cl.
CPC .... *G06Q 20/4016* (2013.01); *G06Q 10/06375* (2013.01); *G06Q 20/40* (2013.01); *G06Q 30/02* (2013.01); *G06Q 30/0202* (2013.01); *G06Q 30/0205* (2013.01); *G06Q 30/0224* (2013.01); *G06Q 40/00* (2013.01); *G06Q 40/12* (2013.12); *G06Q 10/04* (2013.01)

(58) Field of Classification Search
None
See application file for complete search history.

(56) References Cited

U.S. PATENT DOCUMENTS

| | | |
|---|---|---|
| 4,908,761 A | 3/1990 | Tai |
| 5,283,829 A | 2/1994 | Anderson |
| 5,710,578 A | 1/1998 | Beauregard et al. |
| 5,819,226 A | 10/1998 | Gopinathan et al. |
| 5,974,396 A | 10/1999 | Anderson et al. |

(Continued)

FOREIGN PATENT DOCUMENTS

| | | |
|---|---|---|
| KR | 10-2000-0072818 A | 12/2000 |
| KR | 10-0521752 B1 | 10/2005 |

(Continued)

OTHER PUBLICATIONS

Cui, "Data Mining in Marketing Using Bayesian Networks and Evolutionary Programming," in "E-Commerce and Intelligent Methods," edited by Segovia, Springer-Verlag, 2002, pp. 198-214.*

(Continued)

*Primary Examiner* — Ivan R Goldberg
(74) *Attorney, Agent, or Firm* — Kilpatrick Townsend & Stockton

(57) ABSTRACT

Methods, apparatus, and systems are provided for tracking and analyzing data of consumer activity. The tracked data can be organized (e.g. as stored in cache, RAM, hard drives) in certain types of tables, where the tables can be associated with certain tags (keys) for efficiently accessing the data. The organization and associations of the data can also provide simple mechanisms for manipulating the data to obtain results specifically relevant for a task, such as detection of fraud or prediction of consumer behavior to provide better customer service or new services. For example, the tables may contain counters that store the number of times that two correlated consumer events occur within specific time intervals of each other. Such time data can provide efficient determination of patterns of consumer activity.

33 Claims, 16 Drawing Sheets

(56) References Cited

U.S. PATENT DOCUMENTS

| | | | |
|---|---|---|---|
| 6,018,723 A | 1/2000 | Siegel et al. | |
| 6,018,724 A | 1/2000 | Arent | |
| 6,119,103 A | 9/2000 | Basch et al. | |
| 6,226,624 B1 | 5/2001 | Watson et al. | |
| 6,334,110 B1 | 12/2001 | Walter et al. | |
| 6,422,462 B1 | 7/2002 | Cohen | |
| 6,430,359 B1 | 8/2002 | Yuen et al. | |
| 6,430,539 B1 | 8/2002 | Lazarus et al. | |
| 6,658,393 B1 | 12/2003 | Basch et al. | |
| 6,725,210 B1 | 4/2004 | Key et al. | |
| 7,039,607 B2 | 5/2006 | Watarai et al. | |
| 7,165,037 B2 | 1/2007 | Lazarus et al. | |
| 7,197,474 B1* | 3/2007 | Kitts | 705/7.31 |
| 7,227,950 B2 | 6/2007 | Faith et al. | |
| 7,251,624 B1 | 7/2007 | Lee et al. | |
| 7,376,618 B1 | 5/2008 | Anderson et al. | |
| 7,505,931 B2 | 3/2009 | Da Silva | |
| 7,533,038 B2 | 5/2009 | Blume et al. | |
| 7,555,444 B1 | 6/2009 | Wilson | |
| 7,630,924 B1 | 12/2009 | Collins et al. | |
| 7,653,594 B2 | 1/2010 | Davis | |
| 7,881,822 B2 | 2/2011 | Thornton et al. | |
| 7,959,074 B1 | 6/2011 | Chopra | |
| 8,032,410 B2 | 10/2011 | Main | |
| 8,352,315 B2 | 1/2013 | Faith et al. | |
| 8,560,449 B1 | 10/2013 | Sears | |
| 2001/0003099 A1 | 6/2001 | Von Kohorn | |
| 2001/0032878 A1 | 10/2001 | Tsiounis et al. | |
| 2002/0032609 A1 | 3/2002 | Wilkman | |
| 2002/0035539 A1 | 3/2002 | O'Connell | |
| 2002/0042718 A1 | 4/2002 | Jett | |
| 2002/0099649 A1 | 7/2002 | Lee et al. | |
| 2002/0111907 A1 | 8/2002 | Ling | |
| 2002/0133721 A1* | 9/2002 | Adjaoute | G06Q 20/04 726/23 |
| 2002/0169720 A1 | 11/2002 | Wilson et al. | |
| 2002/0174222 A1 | 11/2002 | Cox | |
| 2002/0188510 A1 | 12/2002 | Arias | |
| 2002/0194503 A1* | 12/2002 | Faith | G06Q 20/382 726/4 |
| 2003/0028481 A1 | 2/2003 | Flitcroft | |
| 2003/0061172 A1 | 3/2003 | Robinson | |
| 2003/0065555 A1* | 4/2003 | von Gonten et al. | 705/10 |
| 2003/0177087 A1 | 9/2003 | Lawrence | |
| 2004/0034570 A1 | 2/2004 | Davis | |
| 2004/0039676 A1 | 2/2004 | Trainer | |
| 2004/0117261 A1 | 6/2004 | Walker et al. | |
| 2004/0138958 A1* | 7/2004 | Watarai et al. | 705/10 |
| 2004/0148254 A1 | 7/2004 | Hauser | |
| 2004/0167823 A1 | 8/2004 | Neely et al. | |
| 2004/0230535 A1 | 11/2004 | Binder et al. | |
| 2004/0249712 A1 | 12/2004 | Brown et al. | |
| 2005/0080806 A1* | 4/2005 | Doganata et al. | 707/102 |
| 2005/0125317 A1 | 6/2005 | Winkelman et al. | |
| 2005/0131808 A1 | 6/2005 | Villa | |
| 2005/0131816 A1 | 6/2005 | Britto | |
| 2005/0154629 A1* | 7/2005 | Matsuda et al. | 705/10 |
| 2005/0197954 A1* | 9/2005 | Maitland et al. | 705/39 |
| 2005/0267809 A1 | 12/2005 | Zhens | |
| 2006/0097043 A1 | 5/2006 | Johnson | |
| 2006/0143071 A1* | 6/2006 | Hofmann | 705/10 |
| 2006/0143075 A1* | 6/2006 | Carr et al. | 705/10 |
| 2006/0178930 A1 | 8/2006 | Kim | |
| 2006/0195390 A1 | 8/2006 | Rusk et al. | |
| 2006/0248020 A1 | 11/2006 | Robinson | |
| 2007/0033185 A1* | 2/2007 | Maag | 707/6 |
| 2007/0073630 A1 | 3/2007 | Greene et al. | |
| 2007/0078869 A1* | 4/2007 | Carr et al. | 707/100 |
| 2007/0083400 A1 | 4/2007 | Katz | |
| 2007/0094066 A1* | 4/2007 | Kumar et al. | 705/10 |
| 2007/0094067 A1* | 4/2007 | Kumar et al. | 705/10 |
| 2007/0100680 A1* | 5/2007 | Kumar et al. | 705/10 |
| 2007/0100682 A1 | 5/2007 | Kazali | |
| 2007/0118421 A1* | 5/2007 | Oku | 705/10 |
| 2007/0150601 A1 | 6/2007 | Angelica | |
| 2007/0156515 A1 | 7/2007 | Hasselback et al. | |
| 2007/0203725 A1 | 8/2007 | Jung et al. | |
| 2007/0219900 A1 | 9/2007 | MacGuire | |
| 2007/0244741 A1* | 10/2007 | Blume et al. | 705/10 |
| 2007/0256124 A1 | 11/2007 | Ih et al. | |
| 2008/0021803 A1 | 1/2008 | Ahles et al. | |
| 2008/0086415 A1 | 4/2008 | Bubris et al. | |
| 2008/0172289 A1* | 7/2008 | Oh et al. | 705/7 |
| 2008/0203153 A1 | 8/2008 | Keithley et al. | |
| 2008/0270398 A1* | 10/2008 | Landau et al. | 705/27 |
| 2009/0018919 A1 | 1/2009 | Walker et al. | |
| 2009/0024444 A1* | 1/2009 | Shan | 705/10 |
| 2009/0198614 A1 | 8/2009 | De Ruiter et al. | |
| 2009/0234683 A1 | 9/2009 | Anderson et al. | |
| 2009/0254484 A1 | 10/2009 | Forero | |
| 2010/0153241 A1* | 6/2010 | Rucker et al. | 705/30 |
| 2010/0161379 A1* | 6/2010 | Bene et al. | 705/10 |
| 2010/0241547 A1 | 9/2010 | Wolfson et al. | |
| 2010/0280880 A1 | 11/2010 | Faith et al. | |
| 2010/0280881 A1 | 11/2010 | Faith et al. | |
| 2010/0280927 A1 | 11/2010 | Faith et al. | |
| 2010/0280950 A1 | 11/2010 | Faith et al. | |
| 2011/0000961 A1 | 1/2011 | McNeal | |
| 2012/0030115 A1 | 2/2012 | Peace | |
| 2014/0006284 A1 | 1/2014 | Faith et al. | |

FOREIGN PATENT DOCUMENTS

| | | |
|---|---|---|
| KR | 10-2006-0012541 A | 2/2006 |
| KR | 10-2006-0053214 A | 5/2006 |
| KR | 10-0726621 B1 | 6/2007 |
| KR | 10-2009-0001751 A | 1/2009 |
| WO | 95/30211 A1 | 11/1995 |
| WO | 96/36934 A1 | 11/1996 |
| WO | WO 00/077748 A1 | 12/2000 |
| WO | WO 03/038666 A1 | 5/2003 |
| WO | 2008/021381 A2 | 2/2008 |

OTHER PUBLICATIONS

Thakur, "Graph Theoretic Based Algorithm for Mining Frequent Patterns," 2008, IEEE International Joint Conference on Computational Intelligence (IJCNN 2008), pp. 628-632.*

International Search Report and Written Opinion mailed Nov. 29, 2010 for International Application No. PCT/US2010/033556, filed May 4, 2010, 11 pgs.

International Search Report and Written Opinion mailed Nov. 30, 2010 for PCT Patent Application No. PCT/US2010/033567, 10 pages.

International Preliminary Report on Patentability mailed on Nov. 17, 2011 for PCT Patent Application No. PCT/US2010/033567, 7 pages.

International Search Report and Written Opinion mailed Dec. 20, 2010 for PCT Patent Application No. PCT/2010/033578, 10 pages.

Non-Final Office Action mailed on Aug. 26, 2011 for U.S. Appl. No. 12/773,763, filed May 4, 2010, 17 pages.

Final Office Action mailed on Feb. 8, 2012 for U.S. Appl. No. 12/773,763, filed May 4, 2010, 22 pages.

Non-Final Office Action mailed on Mar. 30, 2012 for U.S. Appl. No. 12/773,766, filed May 4, 2010, 13 pages.

Non-Final Office Action mailed on Mar. 30, 2012 for U.S. Appl. No. 12/773,767, filed May 4, 2010, 13 pages.

Non-Final Office Action mailed on Jul. 24, 2012 for U.S. Appl. No. 12/773,765, filed May 4, 2010, 23 pages.

Canadian Office Action mailed on May 25, 2012 for CA Patent Application No. 2,760,769, 4 pages.

Final Office Action mailed on Apr. 12, 2013 for U.S. Appl. No. 12/773,765, filed May 4, 2010, 27 pages.

Final Office Action mailed on Feb. 13, 2013 for U.S. Appl. No. 12/773,767, filed May 4, 2010, 15 pages.

Russian Office Action mailed on Apr. 23, 2013 for RU Patent Application No. 2011149335/08(074022), with English Translation, 12 pages.

Australian Notice of Acceptance mailed on Aug. 22, 2013 for AU Patent Application No. 2010246077, 2 pages.

(56) References Cited

OTHER PUBLICATIONS

Russian Decision on Grant received on Aug. 22, 2013 for RU Patent Application No. 2011149335/08(074022). English Translation, 10 pages.
Russian Decision to Grant mailed on Aug. 22, 2013 for RU Patent Application No. 2011149335/08(074022), English Translation, 10 pages.
Australian Office Action mailed on Aug. 21, 2013, for AU Patent Application No. 2010246009, 3 pages.
Canadian Office Action for Canadian Patent Application No. 2,760,835. Mailed on Oct. 21, 2013. 3 pages.
Canadian Office Action mailed on Jan. 8, 2014 for CA Patent Application No. 2,760,770. 2 pages.
Final Office Action mailed on Oct. 12, 2012 for U.S. Appl. No. 12/773,767, filed May 4, 2012, 15 pages.
Notice of Allowance and Examiner Interview Summary mailed on Sep. 10, 2012 for U.S. Appl. No. 12/773,763, 13 pages.
Duhigg, "How Companies Learn Your Secrets," 2012, New York Times, 10 pages.
Final Office Action mailed on Dec. 7, 2012 for U.S. Appl. No. 12/773,766, filed May 4, 2010, 16 pages.
Australian Office Action mailed on Nov. 27, 2012, for AU Patent Application No. 2010246077, 4 pages.
Australian Office Action mailed on Nov. 13, 2012, for AU Patent Application No. 2010246009, 4 pages.
Non-Final Office Action mailed on Feb. 21, 2014 for U.S. Appl. No. 13/710,059, 10 pages.
Australian Notice of Acceptance mailed on Mar. 26, 2014 for AU Patent Application No. 2010246009, 2 pages.
Final Office Action mailed on Oct. 6, 2014 for U.S. Appl. No. 13/710,059, 6 pages.
Non-Final Office Action mailed on Sep. 11, 2014 for U.S. Appl. No. 12/773,767, 16 pages.
Non-Final Office Action mailed on Sep. 17, 2014 for U.S. Appl. No. 12/773,766, 18 pages.
Final Office Action mailed on Jul. 1, 2015 for U.S. Appl. No. 12/773,765, 28 pages.
Final Office Action mailed Aug. 20, 2015 for U.S. Appl. No. 13/710,059, 13 pages.
Australian Office Action mailed on Aug. 25, 2015 for AU Patent Application No. 2010246085, 4 pages.
Final Office Action mailed on Apr. 9, 2015 for U.S. Appl. No. 12/773,766, 25 pages.
Non-Final Office Action mailed Dec. 15, 2014 for U.S. Appl. No. 12/773,765, 25 pages.
Non-Final Office Action mailed Jan. 7, 2015 for U.S. Appl. No. 13/710,059, 6 pages.
Final Office Action mailed on Jan. 8, 2015 for U.S. Appl. No. 12/773,767, 16 pages.
Australian Office Action mailed on May 6, 2015 for AU Patent Application No. 2013267037, 4 pages.
Non-Final Office Action dated Mar. 18, 2016 in re U.S. Appl. No. 13/710,059, filed Dec. 10, 2012, 14 pages.
First Examination Report dated Jan. 25, 2016, in re Australian Application No. 2014203417 filed May 4, 2010.

\* cited by examiner

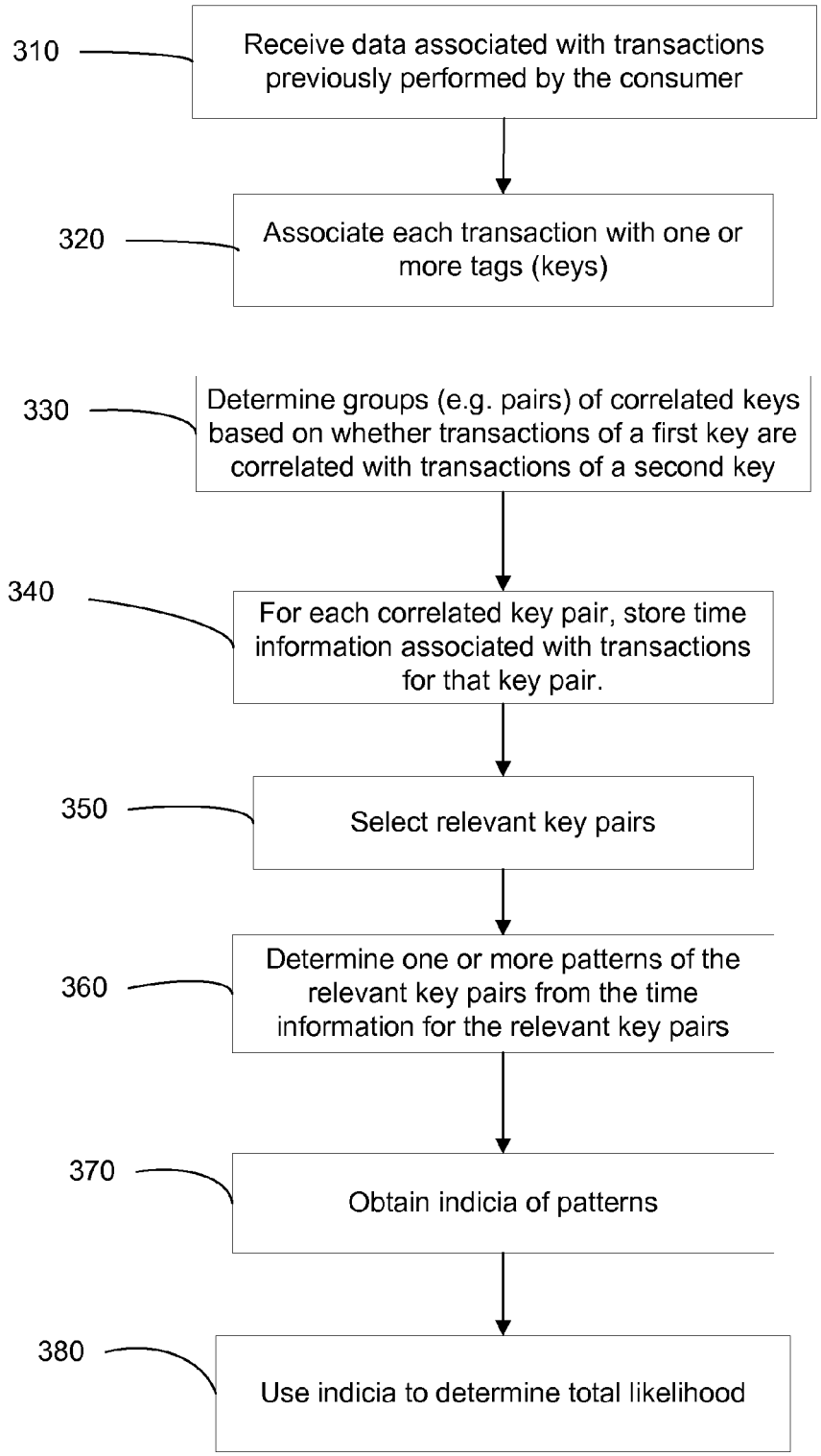

600 Transaction data = { Country, zip code, merchant code, industry code, time and date, product code, account number}

620  K1 = { US, 94566, 4812, 3, 0000 0000 0000 0001, XYZ inc.}  630  K2 = { US}

670  Account entity (consumer) = 0000 0000 0000 0001

680  Correlated key pairs (key pairs being tracked):

705 Query = <K4

710 Result = <K4|K5>, <K4|K56>,
<K4|K11>, <K4|K*>, <K4|K55>

715 Query = |K5>

720 Result = <K4|K5>, <K46|K5>,
<K11|K5>, <K*|K5>, <K14|K5>

725 Query = |94566>

730 Result = <K4|94566>,
<K46|94566,4812>

FIG. 7A

| Key Pair # 750 | Hash of KI 760 | Hash of KF 770 |
|---|---|---|
| 1 | | |
| 2 | | |
| 3 | | |
| 4 | | |
| 5 | | |

K5 transaction

Recent Transaction(s)
<K2:K1>

| | | | |
|---|---|---|---|
| 1 | | | |
| | | | |
| | | | |
| | | | |

910

○

Established
Pattern <K2:K1>

| | | | |
|---|---|---|---|
| 2 | | | |
| | | | |
| | | | |
| | | | |

FREQUENCY-BASED TRANSACTION PREDICTION AND PROCESSING

CROSS-REFERENCES TO RELATED APPLICATIONS

The present application claims priority from and is a nonprovisional application of U.S. Provisional Application No. 61/175,381, entitled "SYSTEMS AND METHODS FOR DETERMINING AUTHORIZATION, RISK SCORES, AND PREDICTION OF TRANSACTIONS" filed May 4, 2009, the entire contents of which are herein incorporated by reference for all purposes.

This application is related to commonly owned and concurrently filed U.S. application Ser. No. 12/773,763, filed May 4, 2010 and entitled "PRE-AUTHORIZATION OF A TRANSACTION USING PREDICTIVE MODELING" by Faith et al., U.S. patent application Ser. No. 12/773,765, filed May 4, 2010 and entitled "DETERMINING TARGETED INCENTIVES BASED ON CONSUMER TRANSACTION HISTORY" by Faith et al., U.S. patent application Ser. No. 12/773,766, filed May 10, 2010 and entitled "DEMOGRAPHIC ANALYSIS USING TIME-BASED CONSUMER TRANSACTION HISTORIES" by Faith et al., and U.S. patent application Ser. No. 12/773,767, filed May 4, 2010 and entitled "TRANSACTION AUTHORIZATION USING TIME-DEPENDENT TRANSACTION PATTERNS" by Faith et al., the entire contents of which are herein incorporated by reference for all purposes.

BACKGROUND

The present application is generally related to consumer events (e.g. transactions), and more specifically to tracking consumer activity, which may be used in processing consumer transactions.

An amount that a consumer spends and the general type of goods that a consumer buys can be used in marketing efforts. Efforts to track such consumer activity have generally looked only at the broad behavior of a consumer, e.g., total amount spent by a consumer within a fixed time period. Such efforts to track consumer activity have also generally analyzed or otherwise used the consumer activity quite infrequently. For example, the consumer behavior might be analyzed only once or twice a year, or just before a big marketing campaign.

The ability to track finely tuned consumer activity can add a large amount of computational and storage complexity. This complexity could necessitate that an analysis of the data be infrequent as any more frequent analysis would not be computationally feasible.

Accordingly, it is desirable to provide more accurate and robust tracking of consumer activity and tracking where the data can be analyzed and used frequently, e.g., in real time.

BRIEF SUMMARY

Embodiments provide systems, apparatus, and methods for tracking and analyzing data of consumer activity. The tracked data can be organized (e.g. as stored in cache, RAM, hard drives) in certain types of tables, where the tables can be associated with certain tags (keys) for efficiently accessing the data. The organization and associations of the data can also provide simple mechanisms for manipulating the data to obtain results specifically relevant for a task, such as detection of fraud or prediction of consumer behavior to provide better customer service or new services. For example, the tables may contain counters that store the number of times that two correlated consumer events occur within specific time intervals of each other. Such time data can provide efficient determination of patterns of consumer activity.

According to one embodiment, a method of determining a likelihood of an occurrence of a transaction involving a consumer is provided. Data associated with transactions previously performed by the consumer are received, and a plurality of correlated pairs of the transactions is determined. Each of a plurality of counters are associated with a time range. For each correlated pair, a first computer apparatus determines a time interval between the transactions of the correlated pair and increases a counter of the plurality of counters. The time interval is within the time range associated with the increased counter. The values of the counters are used to determine a likelihood of an occurrence of another transaction involving the consumer.

According to another embodiment, a method of determining a likelihood of an occurrence of a transaction involving a consumer is provided. Data for events associated with the consumer are received, and a plurality of correlated pairs of the events is determined. One or more keys are associated with each event; and for each correlated pair of the events, one or more key pairs associated with the correlated pair are identified. Each identified key pair has a set of counters, where each counter is associated with a time range. For each correlated pair of events. a first computer apparatus determines a time interval between the two events of the correlated pair, and increases a counter for each key pair associated with the correlated pair of events. The time interval is within the time range associated with the increased counter. The values of the counters are used to determine a likelihood of an occurrence of another event that involves the consumer and that is associated with one or more keys.

Other embodiments of the invention are directed to systems, apparatuses, portable consumer devices, and computer readable media associated with methods described herein.

A better understanding of the nature and advantages of the present invention may be gained with reference to the following detailed description and the accompanying drawings.

BRIEF DESCRIPTION OF THE DRAWINGS

FIG. 3A is a flowchart illustrating a method for analyzing transaction history associated with a consumer according to embodiments of the present invention.

FIG. 6A shows transaction data with example categories of key elements listed according to an embodiment of the present invention.

FIG. 6B shows a set of correlated key pairs being tracked for account entity according to an embodiment of the present invention.

FIG. 7A shows different queries and results according to embodiments of the present invention.

FIG. 7B shows a lookup table of key pair identifiers, where each key pair number has a pair of hashes associated with it, according to embodiments of the present invention.

FIG. 8 shows different tables updated for a same K5 transaction according to an embodiment of the present invention.

FIG. 9 shows an example of obtaining indicia of a similarity of a recent transaction relative to an established transaction pattern of a consumer according to an embodiment of the present invention.

DETAILED DESCRIPTION

Embodiments provide systems, apparatus, and methods for tracking and analyzing data of consumer activity. The tracked data can be organized (e.g. as stored in cache, RAM, hard drives) in certain types of tables, where the tables can be associated with certain tags (keys) for efficiently accessing the data. The organization and associations of the data can also provide simple mechanisms for manipulating the data to obtain results specifically relevant for a task (e.g. detection of fraud or prediction of consumer behavior to provide better customer service or new services).

A framework is provided to track consumers, merchants, area and use different events (e.g. a transaction or beginning of a time period) to determine relevant consumer behavior. The consumer behavior can then be used for different purposes. A general structure of payment processing is first described, then the concept of a pattern for transactions is introduced. A manner for storing timing information for transaction data in tables with discretized time ranges and a relation to periodic functions is discussed. The organization of the tables for different transaction attributes and the extension to different events and entities elaborates on different embodiments. The filtering for relevant events and entities is described so as to obtain the relevant data for calculations. The use of an imaginary part of complex numbers in the tables for estimating when a future transaction is likely is also described. Examples of various calculations using this infrastructure is then provided.

I. System Overview

Figure 1:
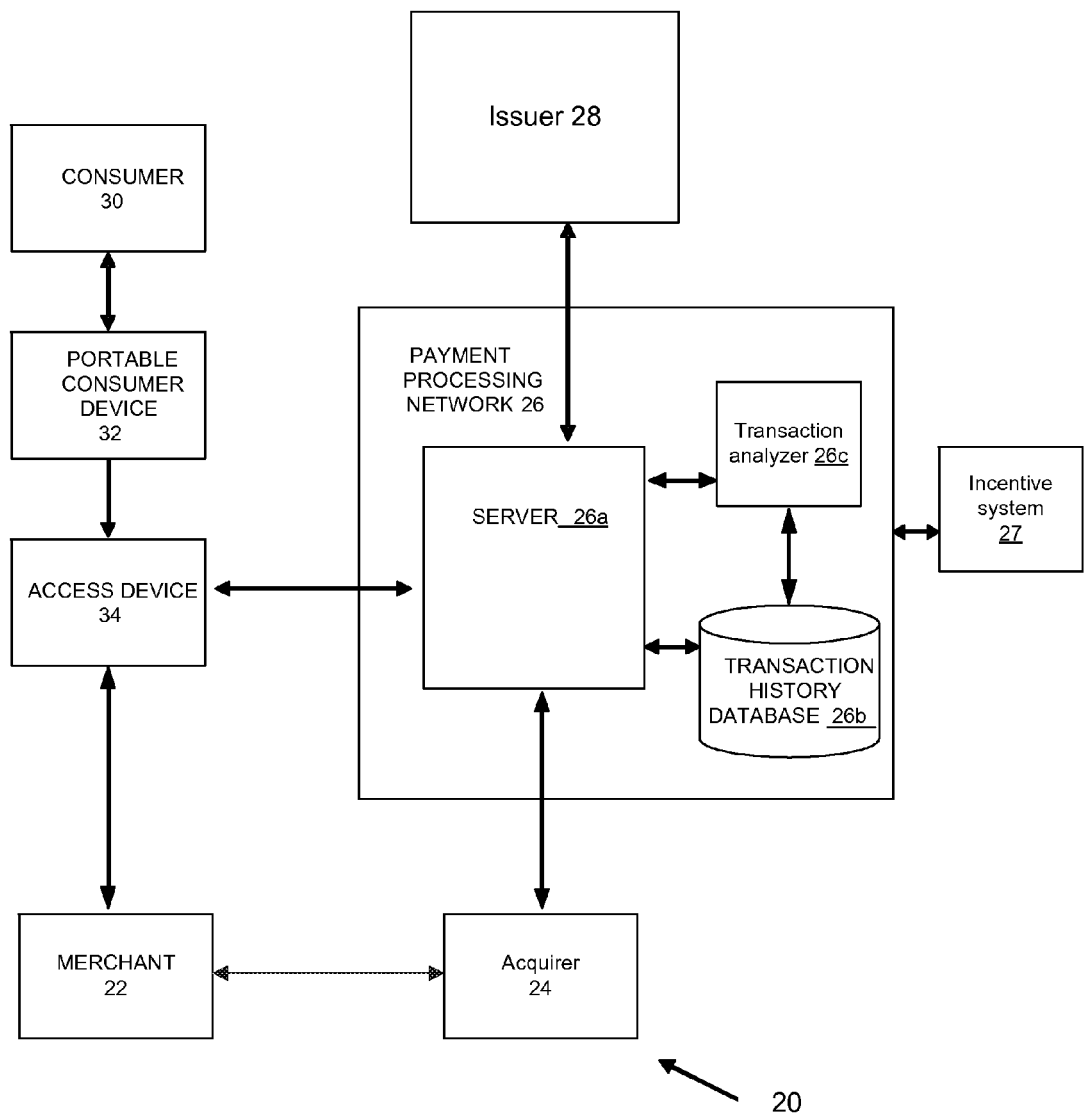
FIG. 1 shows a block diagram of a system according to an embodiment of the invention.

FIG. 1 shows an exemplary system 20 according to an embodiment of the invention. Other systems according to other embodiments of the invention may include more or less components than are shown in FIG. 1.

The system 20 shown in FIG. 1 includes a merchant 22 and an acquirer 24 associated with the merchant 22. In a typical payment transaction, a consumer 30 may purchase goods or services at the merchant 22 using a portable consumer device 32. The merchant 22 could be a physical brick and mortar merchant or an e-merchant. The acquirer 24 can communicate with an issuer 28 via a payment processing network 26. The merchant 22 could alternatively be connected directly to the payment processing network 26. The consumer may interact with the payment processing network 26 and the merchant through an access device 34.

As used herein, an "acquirer" is typically a business entity, e.g., a commercial bank that has a business relationship with a particular merchant or an ATM. An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The consumer 30 may be an individual, or an organization such as a business that is capable of purchasing goods or services. In other embodiments, the consumer 30 may simply be a person who wants to conduct some other type of transaction such as a money transfer transaction or a transaction at an ATM.

The portable consumer device 32 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The merchant 22 may also have, or may receive communications from, an access device 34 that can interact with the portable consumer device 32. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with the portable consumer devices 32.

The access device 34 may also be a wireless phone. In one embodiment, the portable consumer device 32 and the access device are the same device. For example, a consumer may use a wireless to phone to select items to buy through a browser.

When the access device 34 is a personal computer, the interaction of the portable consumer devices 32 may be achieved via the consumer 30 or another person entering the credit card information into an application (e.g. a browser) that was opened to purchase goods or services and that connects to a server of the merchant, e.g. through a web site. In one embodiment, the personal computer may be at a checkout stand of a retail store of the merchant, and the application may already be connected to the merchant server.

The portable consumer device 32 may further include a contactless element, which is typically implemented in the form of a semiconductor chip (or other data storage element) with an associated wireless transfer (e.g., data transmission) element, such as an antenna. Contactless element is associated with (e.g., embedded within) portable consumer device 32 and data or control instructions transmitted via a cellular network may be applied to contactless element by means of a contactless element interface (not shown). The contactless element interface functions to permit the exchange of data and/or control instructions between the mobile device circuitry (and hence the cellular network) and an optional contactless element.

The portable consumer device 32 may also include a processor (e.g., a microprocessor) for processing the functions of the portable consumer device 32 and a display to allow a consumer to see phone numbers and other information and messages.

If the portable consumer device is in the form of a debit, credit, or smartcard, the portable consumer device may also optionally have features such as magnetic strips. Such devices can operate in either a contact or contactless mode.

Referring again to FIG. 1, the payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer or other computer apparatus. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

As shown in FIG. 1, the payment processing network 26 may comprise a server 26a, a transaction history database 26b, and a transaction analyzer 26c. In various embodiments, transaction analyzer 26c can determine patterns in transactions stored in transaction history database 26b to determine certain actions, such as authorizing a transaction or sending an incentive. In one embodiment, an incentive system 27 is coupled with or part of payment processing network 26 and can be used to determine an incentive based on determined transaction patterns. Each of these apparatus can be in communication with each other. In one embodiment, all or parts of transaction analyzer 26c and/or transaction history database 26b may be part of or share circuitry with server 26a.

As used herein, an "incentive" can be any data or information sent to a consumer to encourage a transaction. For example, a coupon can be sent to a consumer as an incentive since the consumer can obtain a better transaction price. As another example, an advertisement can be sent to a consumer to encourage a transaction by making the consumer aware of a product or service. Other example of incentives can include rewards for making a transaction and preferential treatment when making the transaction.

In one embodiment, the payment processing network 26 may have relationship deals with specific companies, advertisers, or manufacturers for sending incentives. The payment processing network 26 may then retrieve an incentive from an incentive system 27 that is coupled with or part of the payment processing network 26. The incentive system 27 may be a simple repository of incentives or information on specific incentives. In one embodiment, the payment processing network 26 can identify specific properties of a incentive (e.g. merchant, merchant type, product, . . . ) and then query the incentive system 27 for an incentive. The incentive system 27 may be tasked with keeping an up to date listing of incentives that may be used. The incentive system 27 may also retrieve incentives from servers associated with particular merchants, manufactures, advertisers, or other companies.

The issuer 28 may be a bank or other organization that may have an account associated with the consumer 30. The issuer 28 may operate a server which may be in communication with the payment processing network 26.

Embodiments of the invention are not limited to the above-described embodiments. For example, although separate functional blocks are shown for an issuer, payment processing network, and acquirer, some entities perform all or any suitable combination of these functions and may be included in embodiments of invention. Additional components may also be included in embodiments of the invention.

II. Identifying Patterns

Consumer activity can include transactions, among other things. Knowledge of a pattern of transactions of a consumer can allow better fraud detection, better customer service by preparing for a transaction, or an identification of opportunities to incentivize continuing or new behavior of a consumer, as well as provide other advantages. However, the identification of a pattern can be difficult given the enormous amount of data, some of which might exhibit patterns and some of which may not.

As used herein, the term "pattern" refers broadly to a behavior of any set of events (e.g. transactions) that have a likelihood of repeating. In one aspect, the likelihood can be greater than a random set of events, e.g., events that are uncorrelated. The likelihood can be expressed as a probability (e.g. as a percentage or ratio), a rank (e.g. with numbers or organized words), or other suitable values or characters. One type of pattern is a frequency-based pattern in which the events repeats with one or more frequencies, which may be predefined. To define a pattern, a reference frame may be used. In various embodiments, the reference frame may be or include an elapsed time since a last event (e.g. of a type correlated to the current event), since a beginning of a fixed time period, such as day, week, month, year, . . . (which is an example of a starting event), before an end of a fixed time period, or before occurrence of a scheduled event (an example of an ending event). Another event can be certain actions by the consumer, such as traveling to a specific geographic location or browsing a certain address location on the Internet.

Figure 2A:
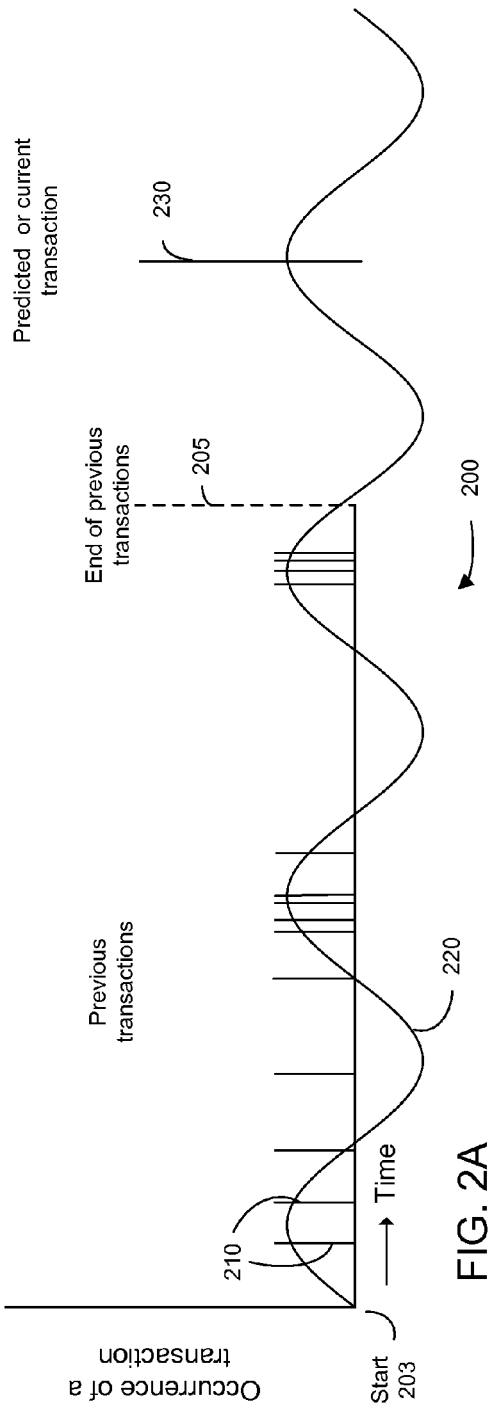
FIGS. 2A and 2B shows plots of transaction history of a consumer as analyzed according to embodiments of the present invention.

FIG. 2A shows a plot 200 of a transaction history or other events of a consumer as analyzed according to embodiments of the present invention. Plot 200 shows times at which each of a plurality of previous transactions 210 have occurred. As shown, time is an absolute time (e.g. date and time), but it can be an elapsed time in other embodiments. Herein, the term "time" can refer to either or both a date and a time of a particular day. These previous transactions 210, which occur before an end time 205, can be analyzed to determine a pattern 220, which can be a function that approximates when the transactions are likely to occur. As examples, an identified pattern can be used to predict a next transaction or authorize a new transaction, e.g. transaction 230.

The identification of a pattern can have many difficulties. If the previous transactions 210 include all of the transactions of a consumer and exhibit only one pattern, then the identification of a pattern may be relatively easy. However, if only certain types of transactions for a consumer show a pattern, then the identification can be more difficult. Some embodiments can use keys (K1, K2, . . . ) to facilitate the analysis of certain types of transactions, where a key can correspond to a type of transaction. The keys also allow identification of transactions as being relevant for a current task (e.g. associated with a current transaction).

Adding to the complexity can be whether the path to a particular transaction has an impact on the pattern, e.g., a pattern that exists only when certain transactions precede or follow a transaction. Embodiments can store transaction data associated with a specific order of keys (e.g. K1, K3). In this manner, the data for that specific order can be analyzed to determine the pattern. The order of keys also allows the further identification of relevant transactions.

All of this complexity can be further compounded in instances where a certain path (sequence of two or more transactions) can have more than one pattern. Embodiments can use certain functional forms to help identify different patterns. In some embodiments, periodic functions are used, e.g., $e^{-iwt}$, where w is a frequency of the pattern. In one embodiment, the frequencies are pre-selected thereby allowing an efficient determination of the patterns. Further, the frequencies can be identified by an associated wavelength, or wavelength range. Counters can be used for each wavelength range, thereby allowing a pattern to be very quickly identified by analyzing the values of the counters.

Various embodiments can handle certain ones or all of these instances of complexity. Herein, examples of lower complexity are introduced first in order to gain an understanding of the basic concepts, and examples of higher complexity are added later.

FIG. 3A is a flowchart illustrating a method 300 for analyzing transaction history associated with a consumer according to embodiments of the present invention. For example, the previous transactions 210 can be considered as the transaction history. In one embodiment, transactions within a specific time period are analyzed, e.g., last year or within a certain time window (e.g. shown start 203 to end 205). In another embodiment, all transactions before an analysis time are analyzed as part of the transaction history. The transactions can also be filtered based on certain criteria, such that only certain types of transactions are analyzed. The transaction history can include valid and fraudulent transactions. All or parts of method 300 or other methods herein can be performed by a computer system that can include all or parts of network 26; such a system can include disparate subsystems that can exchange data, for example, via a network, by reading and writing to a same memory, or via portable memory devices that are transferred from one subsystem to another.

In step 310, a computer apparatus (e.g. all or portions of network 26, such as database 26b and analyzer 26c) receives data associated with transactions previously performed by the consumer. Each transaction can have any number of pieces of data associated with it. For example, the data may include categories of an account number, amount of the transaction, a time and date, type or name of product or service involved in the transaction, merchant name or code (mcc), industry code, terminal field (whether a card is swiped), and geographic location (country, zip code, . . . ). In one embodiment, a merchant could be a whole chain or a particular store of a chain. In some embodiments, the transaction data can also include video and/or audio data, e.g., to identify a person or a behavior of a person. The transaction data can be different for each transaction, including the account number. For example, the consumer can be identified with the account number and other account numbers of the consumer can be included in the analysis of the behavior of the consumer.

In step 320, each transaction is associated with one or more keys (e.g., K1, K2, . . . ). In various embodiments, a key can includes parts of the transaction data and/or data derived from the transaction data. For example, a key could identify the transaction by including one or more of an account number (or other identifying alphanumeric code), a time and date, merchant name, industry code, and geographic location (country, zip code, . . . ). A key could also be composed of results from an analysis of a transaction, e.g., whether the transaction is a card-present transaction or a card-not-present transaction could be determined from the transaction data and included in the key.

Each piece of data of a key is referred to as a key element. A longer key can have more key elements and may be a more selective identifier of a type of transactions. Thus, each transaction can be associated with different keys, each with a different scope of specificity for characterizing the transaction.

Figure 3B:
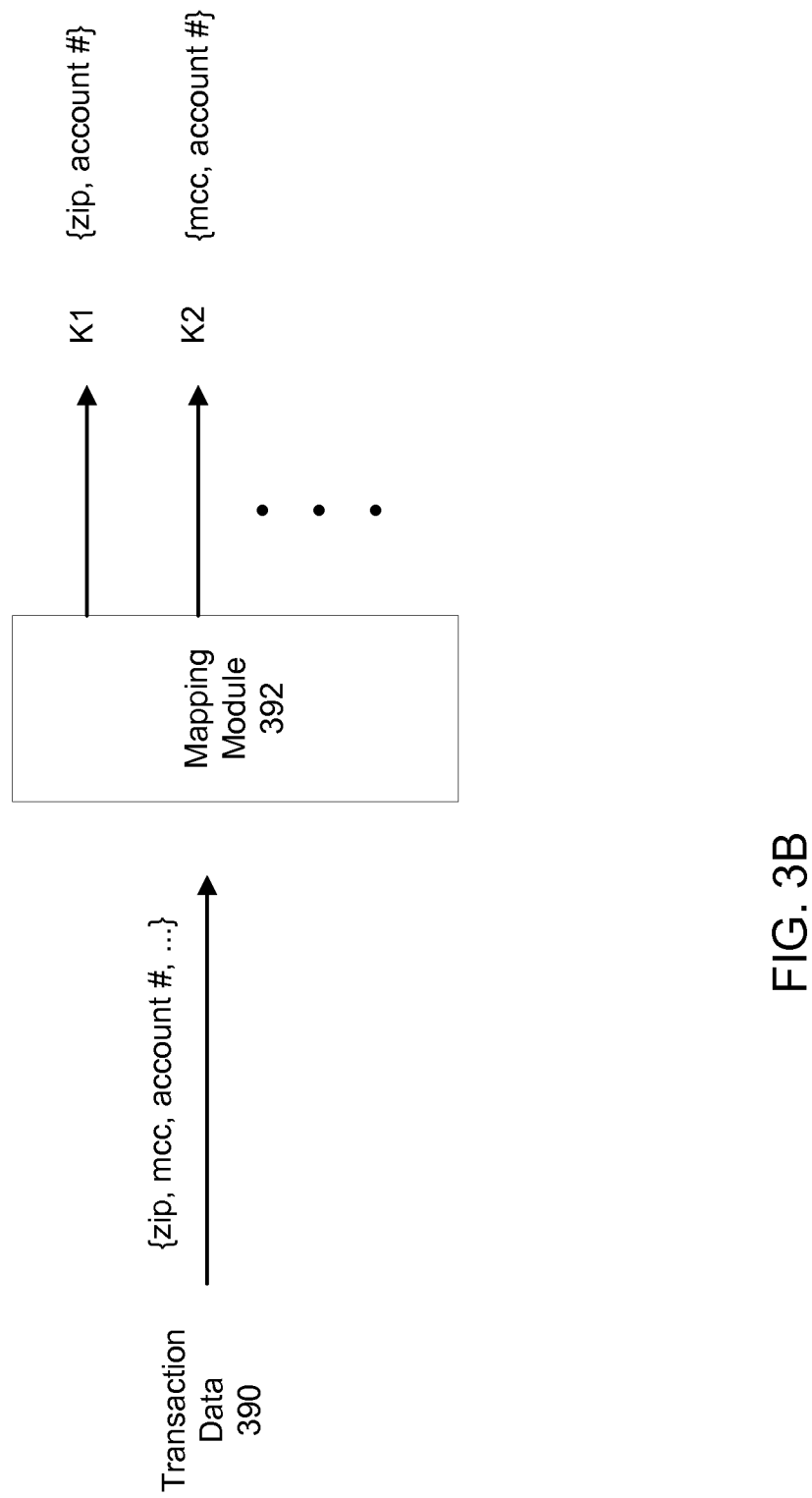
FIG. 3B shows a mapping module that receives transaction data and provides keys that are associated with the transaction data according to embodiments of the present invention.

FIG. 3B shows a mapping module 392 that receives transaction data 390 and provides keys (e.g. K1 and K2) that are associated with the transaction data according to embodiments. In the simple example shown, the transaction data 390 includes a zip code, merchant code, and account number. Mapping module 392 determines that there are at least two keys K1 (zip, account #) and K2 (mcc, account #) associated with the transaction data. These keys can be used to track various levels of detail about transactions across, for example, multiple zip codes, merchant codes, and account numbers. In one aspect, the more keys that are associated, the more various information is tracked. Mapping module 392 may be performed in various ways. For example, U.S. Pat. No. 7,227,950 to Faith et al. describes some implementations using doors and locks for associating transaction data with a key.

In some embodiments, mapping module 392 can have a prescribed set of operations, which can provide a various number of associated keys depending on the transaction data received. In one embodiment, these operations can be performed in the same order for each set of transaction data that is received. In other embodiments, the order and specific functions performed by mapping module 392 may change depending on the transaction data and intermediate data derived therefrom. For example, a different set of mapping functions may be used for particular account numbers, which can result in more information being tracked for a particular consumer (e.g. if the consumer spends a lot of money or is associated with a lot of fraud). Mapping module 392 can retrieve data or functions from a memory in order to provide a result tailored to the received transaction data.

Referring back to FIG. 3A, in step 330, pairs of correlated keys (e.g. a key pair $<K_I:K_F>$) are determined based on whether transactions associated with an initial key (KI) are correlated with transactions with a final a final key (KF). A first (initial) transaction can be correlated with a later (final) transaction. The initial key and the final key may be the same or different from each other. For example, a transaction at one merchant may be correlated to a later purchase at another merchant, which might occur if the merchants are near to each other. In one embodiment, a group of more than two keys could be correlated together, e.g. a group of three keys can be correlated.

In one embodiment, the transactions are correlated if the two transactions appear a significant number of times. A proximity in time may also be used as a criteria. The likelihood of two transactions being correlated typically is reduced if more key elements (e.g. transaction data) is used in the keys. In one embodiment, the two keys of a key pair have the same level of specificity.

Transactions can be correlated in multiple ways depending on how many keys are associated with each transaction. Thus, two transactions can contribute to more than one key pair, when the transactions are associated with multiple keys. For example, if an initial transaction is associated with two keys and the final transaction is also associated with two keys, then there could be four resulting key pairs.

A transaction may be correlated to another transaction only via certain keys. For example, a first transaction T1 is associated with keys K1 and K2, and a second transaction T2 is associated with keys K3 and K4. If <K1:K2> is a correlated key pair, then data for transactions T1 and T2 are associated with the key pair <K1:K2>. But if <K3:K4> are not correlated, then the key pair <K3:K4> is not tracked, and thus no transaction data is associated with it. Effectively different keys for the same transaction can be viewed as different transactions.

In step 340, for each correlated key pair, time information associated with transactions for that key pair or other key group is stored (e.g. in transaction history database 26b). In one aspect, a key pair identifier (e.g. a unique ID number) is associated with the stored time information. As examples of an association, a key pair identifier could point to the time information, the time information could be stored in a same row as the key pair identifier, and the key pair identifier could be stored associated with the pointer.

In some embodiments, the time information for the key pair <K1:K2> can be stored in a database table that can be accessed with a query containing K1, K2, or the combination (potentially in the order of K1:K2). For example, a search for K1 and/or K2 can provide the associated identifiers. In one embodiment, a hash of each key of a pair is also associated with the key pair identifier, so that information for each key can be indexed and found separately. For example, hashes of K1 and K2 can be stored in a lookup table so the key pair identifiers (and thus the key pair information) can be easily found. Thus, storing time information in association with certain key pairs can allow the time information for specific types of transactions to be easily accessed. Also, such organization can provide easier analysis of the data to identify patterns for specific key pairs.

In one embodiment, the time information can be an absolute time. For example, the time and date for all transactions having K1 or K2 can individually be stored for the key pair <K1:K2>, or both stored for each instance of correlation. Other data can be stored as well, such as whether the transaction is K1 or K2 and other data not included in the keys, such as an amount of the transaction. When a key pair is <K1:K1>, the date and time may only need to be stored once.

In another embodiment, the time information can be an elapsed time. For example, the elapsed time may be the time elapsed between a transaction with K1 and the next transaction with K2 for the correlated <K1:K2> pair. In this embodiment, K1 is an initial key and K2 is a final key.

In step 350, relevant key pairs are selected. The relevant key pairs may be determined based on a particular task that the transaction history is being used. For example, if the task is to determine whether to authorize a new transaction (e.g., current transaction 230 in FIG. 2A), then the relevant keys pairs would the pairs that include keys associated with the new transaction. In one embodiment, the relevant key pairs are all of the key pairs that are associated with the current transaction as a final key.

In step 360, a pattern analyzer (e.g. transaction analyzer 26c) determines one or more patterns of the previous transactions from the time information for the relevant key pairs. As the time information is organized with an association to the relevant key pairs, the pattern analyzer can easily obtain the specific data needed.

For example, assume that FIG. 2A shows all of the transactions with key K1 (i.e. each of the transactions have the same key). The pattern analyzer can obtain this time information by making a query for the key pair <K1:K1>. The time information could be stored as a list of the transactions in chronological order. The occurrences of the transaction can then be analyzed (e.g. Fourier analysis or other functional analysis) to identify a pattern of the times and dates of these transactions. As shown, the transactions are modeled with a periodic function (such as a sine or cosine), which approximates the occurrences of the transactions. Parameters of the function(s) can be modified until a good approximation of the transactions occurring at peaks of the function(s). As shown, pattern 220 exhibits a relatively long wavelength with groups of transactions at the peaks of the pattern.

Figure 2B:
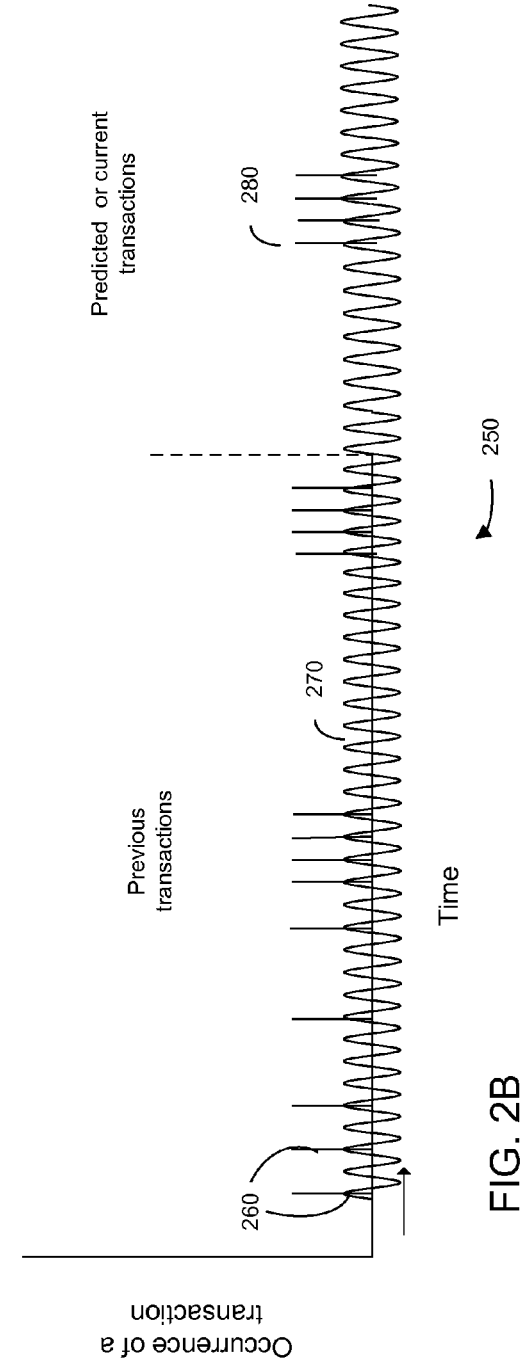

As an example of a different pattern, FIG. 2B shows a plot 250 of previous transactions 260 of a consumer as analyzed according to embodiments of the present invention. In a case where FIG. 2B is for a different key pair <K2:K2>, the data only for that specific key pair can again be accessed easily as the data is already stored associated with the key pair. Thus, pattern 270 for the previous transactions can be identified by only analyzing the transactions associated with the key pair <K2:K2>. Predicted or current transactions 280 can be then analyzed in relation to pattern 270. If both previous transactions 210 and 260 were analyzed as a single set of previous transactions for a consumer, the different patterns 220 and 270 would be harder to identify. Other more efficient methods of determining patterns are discussed later.

In step 370, one or more indicia of the pattern can be obtained. The indicia may be any characteristic of a consumer's transaction pattern, e.g. a numerical value. In one embodiment, the indicia is how a specific transaction relates to an overall pattern of the consumer's transactions. The indicia can also relate a current transaction to patterns of other entities, such as certain demographics or fraudulent patterns.

In various embodiments, the indicia may be a number of transactions in a time range, the probability at a given point in time (e.g., as calculated from a value of the pattern function at the point in time), or other measure related to likelihood. For example, if authorization for a current transaction is requested, the indicia can include the probability for a transaction at the time of the current transaction (e.g. transaction 230). In one embodiment, for a predicted transaction, the indicia can include a probability and a time window of when a high probability for the predicted transaction occurs. The time window can be measured from a time when the analysis is being done (e.g. at the end time 205). The time window may be specified in any number of ways. For example, the time window may specify a start date/time and an end date/time.

In an embodiment where a current transaction has multiple keys associated with it, the indicia (e.g. the probabilities) could be summed. For example, assume that a current transaction has both keys K1 and K2 associated with it. Thus, patterns 220 and 270 both might apply to the transaction. The indicia of both these patterns can be summed, as the total probability for the transaction is affected by both patterns. In one embodiment, having a transaction associated with multiple keys can result in a summing to determine overall likelihood, and separating out the keys can allow the patterns to be more easily identified. In another embodiment, the likelihood values are analyzed separately, as mentioned below.

In step 380, the indicia from one or more patterns can be used to determine a total likelihood, which can be used to determine an action. For example, the indicia can be used to determine a risk score, which can be used to determine whether to authorize a current transaction. An action can also include whether to pre-authorize a transaction or send an incentive (e.g. a coupon). In various embodiments, the total likelihood can correspond to a likelihood that a transaction is fraudulent, a likelihood that a transaction will occur at a specific absolute or relative time, a likelihood (e.g. a percentage) that one consumer's transaction pattern is similar to another consumer's transaction pattern.

In some embodiments, the indicia can be input into a modeling function as part of the determination of the total likelihood. In various implementations, the modeling function can be an optimization function (e.g. a neural network) or can be a decision tree (e.g. composed of IF THEN logic that compares the indicia to one or more cutoff values). In one embodiment, an optimization function can be trained on previous transactions, and thus can determine whether a current event (e.g. a transaction) fits previous patterns by a particular entity (e.g. a consumer or merchant) to a sufficient degree to perform an action. The optimization algorithm can also be trained using previous patterns from multiple entities. In another embodiment, the number of associated keys from step 320 relates to the number of inputs into the modeling function. The relationship is not necessarily one-to-one as similar keys (e.g. ones of a same category) may be combined (e.g. same key elements, but just different values), but there may be a correspondence between the number of different types of keys and the number of inputs.

Examples where Key Pairs have Different Keys

The above examples for identifying a pattern specifically addressed instances when the key pairs were both the same key. In such instances, the absolute times of the transactions can be plotted and fit to a function. However, when the transactions are from two different keys, the identification of a pattern can be more difficult. In these instances, elapsed time (time interval between two events) may be used.

In such an embodiment, the key pair can have an initial key and a final key, as mentioned above. The initial key occurs first in time and the second key occurs second in time. The elapsed time would be the time between the final key and the initial key. Thus, if two keys K1,K2 are correlated there can be two key pairs <K1:K2> and <K2:K1>. Note it is possible that only one of these key pairs exists, since it is possible that the other key pair is not correlated. In one embodiment, where K2 is a current transaction, the elapsed times for a K2 transaction since the last K1 transaction are analyzed.

Figure 4:
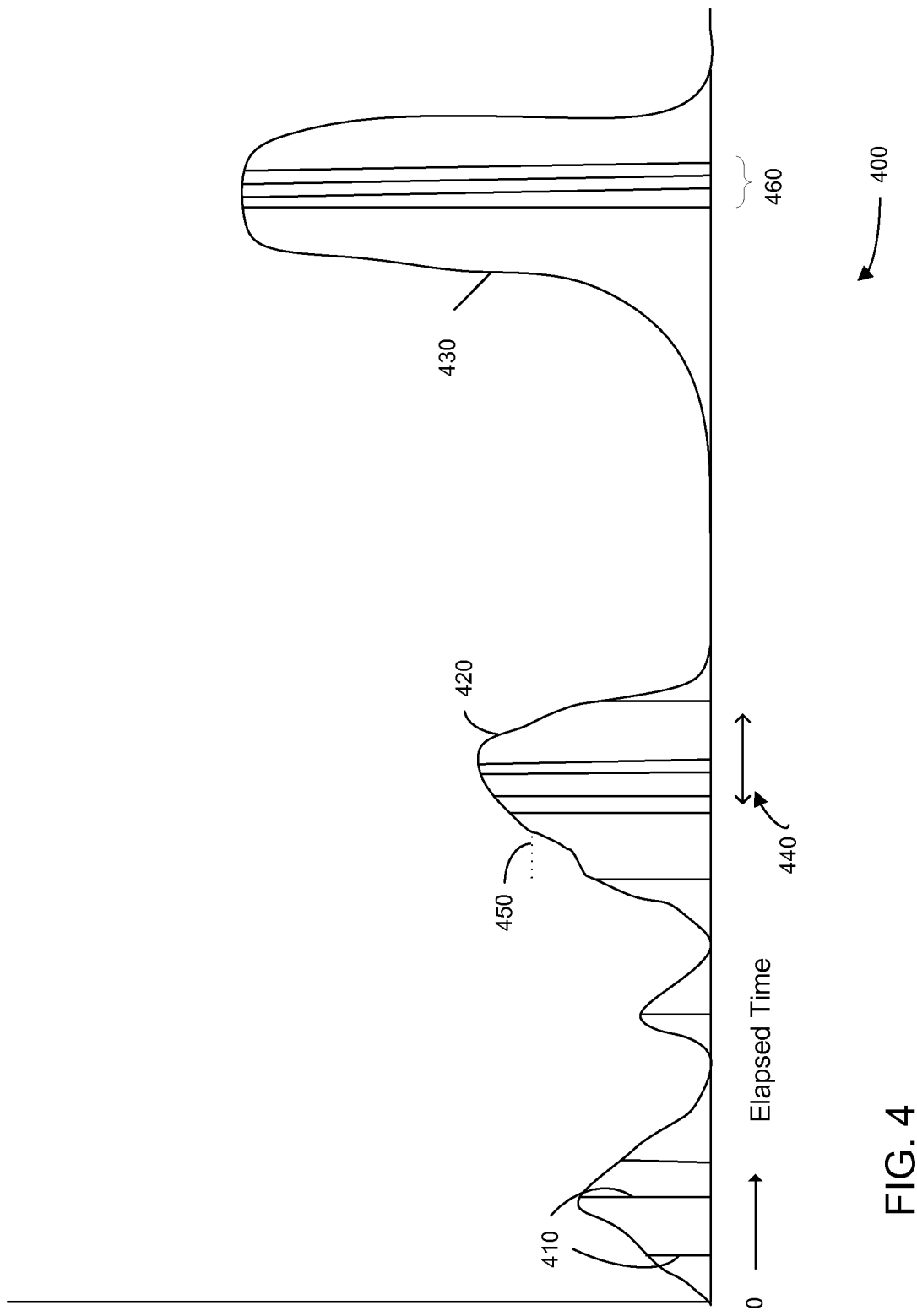
FIG. 4 is a plot of a number of transactions at certain elapsed times between a final key and an initial key of a correlated key pair according to embodiments of the present invention.

FIG. 4 is a plot 400 of a number of transactions at certain elapsed times between a final event (with key KF) and an initial event (with key KI) of a correlated key pair according to embodiments. Plot 400 can be considered as a histogram. The X axis is elapsed time between a final event (e.g. a transaction) and a correlated initial event. Any unit of time may be employed, such as minutes, hours, days, weeks, and even years. The Y axis is proportional to a number of transactions. Each bar 410 corresponds to the number of transactions at an elapsed time. Each bar 410 can increase over time as new transactions are received, where a new transaction would have an elapsed time relative to a correlated initial event. Note that more than one event pair can have the same elapsed time In one embodiment, the X axis can have discrete times. For example, only transactions for each day may be tracked. Thus, if the initial event was the start of a month, then the number of discrete time periods would have a maximum of 31 days. In such an embodiment, elapsed time values within a certain range can all contribute to a same parameter, and bars 410 may be considered as counters. For example, if the discrete times were by day, any two transactions that have an elapsed time of 12 days since a correlated KI event would both cause the same counter to be increased. In one embodiment, these counters are the time information that is stored in step 340 of method 300. In some implementations, the time ranges do not all have the same length. For example, the time ranges closer to zero can have a smaller length (e.g. just a few minutes) than the time ranges further from zero (e.g. days or months).

A pattern 420 can be discerned from the elapsed times. As shown, pattern 420 has a higher value at elapsed times where more transactions have occurred. In one embodiment, pattern 420 could simply be the counters themselves. However, in cases where the time intervals are not discrete or have a small range, bars 410 might have zero or low value at times that happen to lie between many transactions. In these cases, certain embodiments can account for transactions at a specific time as well as transactions at times that are close. For example, as shown, a function representing a pattern of transactions begins curving up and plateaus near the cluster 460 of transactions to form a peak 430. In one embodiment, each time point of the function can have a value of a moving average of the number of transaction within a time period before and after (or just one or the other) the time point. In other embodiments, function can be determined from interpolation or other fitting method (e.g., a fit to periodic functions) performed on the counters.

In some embodiments where elapsed time is being used, the predicted or current transaction can be analyzed relative to time zero, and the indicia may be taken from the pattern at the elapsed time since a last transaction of KI. One indicium may be a time window that a transaction is likely. A width of the function at specific values or times may then be used as the time window In one embodiment, a full width at half maximum may be used, such as the width of peak 430. In another embodiment, the window (e.g., 440) above a threshold value 450 is used, or just part of this window, e.g., starting at the time where pattern 420 is above the threshold and ending at the top (or other part) of peak 430. In yet another embodiment, the time window may have a predetermined width centered or otherwise place around maximum or other value above a threshold.

In embodiments using a threshold, the value of the pattern function may be required to be above the threshold value before a transaction is considered likely enough to occur to send an authorization to a merchant. Multiple threshold levels can be used, with the various levels potentially being used to determine when, how, and what incentives to use. The modeling function mentioned above for step 380 may be used to perform any of these determinations.

In one embodiment, a threshold determination could be whether a counter has a high enough value (absolute or relative to one or more other counter). In another embodiment, a threshold level can be relative (e.g. normalized) compared to a total number of transactions. A normalization or determination of a threshold can be performed by adjusting the level depending on the low values of likelihood of a pattern, e.g., a peak to trough height could be used. In one aspect, the troughs may be offset to zero.

Storing time information that includes a number of transaction at certain elapsed times, one can not only handle paths (such as initial key to final key), but one can also easily identify multiple patterns. Each peak can correspond to a different pattern. For example, each peak can correspond to a different frequency of occurrence for a transaction associated with the final key relative to a transaction associated with the initial key. In one embodiment, the time information for the elapsed times can be stored by storing a time of when both events occur. In another embodiment, time information can store the elapsed time as one value. In yet another embodiment, the time of one event might implicitly include the time of the initial event (e.g. when the first event is beginning of a month or other fixed time period).

From FIG. 4, one can quickly identify one predominant pattern (peak 430) with a long wavelength (short frequency), which does not occur very often, and three minor peaks with higher frequencies. Accordingly, if the transactions of FIGS. 2A and 2B were both patterns for the key pair <K1:K1>, using elapsed time, both patterns 220 and 270 could be identified. However, the determination of a pattern might still take significant computational effort if the pattern can have any functional form.

III. Determining Patterns Using $e^{iwt}$ with Set Frequencies

Some embodiments use certain functional forms to help identify different patterns. As mentioned above, periodic functions can be used, e.g., $e^{iwt}$, where w is a frequency of the pattern. For example, each bar (counter) 410 of FIG. 4 can correspond to a different frequency. The total probability V of a K2 transaction occurring at a time t after a K1 transaction can be considered as proportional to $$\sum_W C_w e^{iwt},$$

where $C_w$ corresponds to the counter value at the frequency w and w runs over all of the frequencies. $C_w$ can be considered a coefficient of the periodic function $e^{iwt}$ at a particular frequency. Thus, conceptually, a probability can be calculated directly from the above formula.

In one embodiment, the frequencies are pre-selected thereby allowing an efficient determination of the patterns. Further, the frequencies can be identified only by the associated wavelength, or wavelength range. Note that in certain embodiments, the use of $e^{iwt}$ is simply a tool and the actual value of the function is not determined.

Figure 5A:
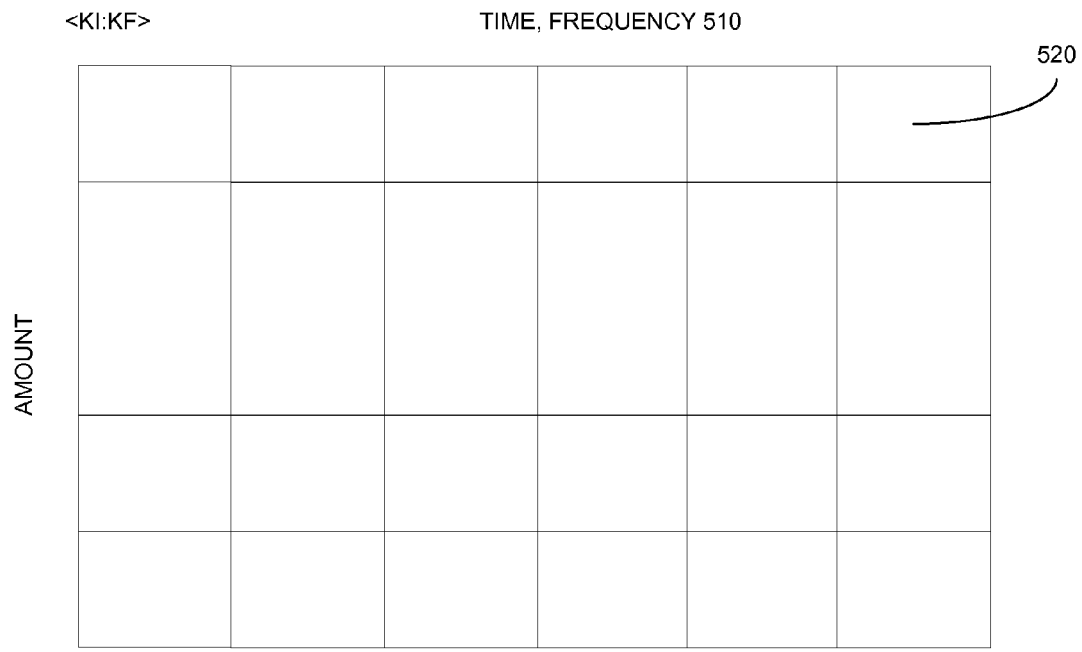
FIG. 5A shows a table that stores time information for a key pair according to embodiments of the present invention.

FIG. 5A shows a table 500 that stores time information for a key pair <KI:KF> according to embodiments of the present invention. The table 500 stores information for elapsed times between transactions associated with the particular key pair, e.g. as performed in step 340 of method 300. Table 500 can also store amount information for the transactions. Table 500 can be viewed as a tabular form of plot 400 along with all the possible variations for different embodiments described for plot 400.

In one embodiment, each column 510 corresponds to a different time range. The time range may correspond to ranges mentioned above with reference to FIG. 4. As shown table 500 has 6 time ranges, but any number of time ranges may be used. The time ranges can be considered to correspond to different functions that approximate the transaction patterns of a consumer or other entity. For example, each time range can correspond to or be considered a different frequency w for $e^{iwt}$.

In some embodiments, table 500 only has one row. In other embodiments, the rows of table 500 correspond to different dollar amounts (or dollar amount ranges). Thus, each time range may have subgroups for set ranges of amounts (e.g. dollar amounts). The organization is similar to a matrix, where a row or a column can be viewed as a group or subgroup. Although five amount ranges are shown, table 500 can have any number of dollar amounts. In some embodiments, there is only one row. i.e. when dollar amounts are not differentiated. Note that the convention of row and column is used for ease of illustration, but either time or amount could be used for either row or column (each an example of an axis). Also, the data for a table can be stored in any manner, e.g. as a single array or a two-dimensional array.

The values for the matrix elements 520 correspond to a number of KF transactions that have elapsed times relative to a KI transaction that fall within the time range of a particular column 510. In one embodiment, each newly received K2 transaction can cause a box (element) 520 of the table (matrix) 500 to be increased. The value can be incremented by one for each transaction, or another integer or non-integer value. The value can also be a complex number, as described below. In another embodiment, a table can be required to have a certain total of all values, average of the values, minimum value in any matrix element, or other measure of the values in the table. Such a requirement can ensure that enough data has been received to provide an accurate pattern.

The values of the matrix elements can be used to determine the pattern for the key pair <KI:KF>, e.g. as part of step 360 of method 300. For example, matrix elements with high values relative to the other matrix elements can indicate a pattern of transactions in the corresponding time range, which can correspond to a particular frequency w. In another embodiment, one could view each matrix element in isolation to determine whether a transaction is likely. For example, if a matrix element exceeds a threshold value, it may be determined that a transaction is likely to occur in that time range. The threshold can be determined in various ways, for example, as a function of a sum of all of the matrix elements, or equivalently can be fixed with the matrix elements being normalized before a comparison to a threshold. Thus, step 360 can be accomplished easier based on how step 340 is done.

As mentioned above, the time ranges can all be of the same length (e.g. 24 hours) or be of varying lengths. In one embodiment, the first column is of very short time length, the second column is of longer time length, and so on. In this manner, more detail is obtained for short wavelengths while still allowing data to be stored for long wavelengths without exhausting storage capacity. In another embodiment, dollar amount ranges are progressively structured in a similar manner as the time ranges can be. In one implementation, the dollar amount range can be used to track the likelihood of transactions having certain dollar amounts. A predicted dollar amount for a likely transaction can be used to determine a price range in which a pre-authorization is valid. Also, a dollar amount for a current transaction can be used to determine a specific likelihood function that corresponds to the amount, e.g., a row of the table.

Figure 5B:
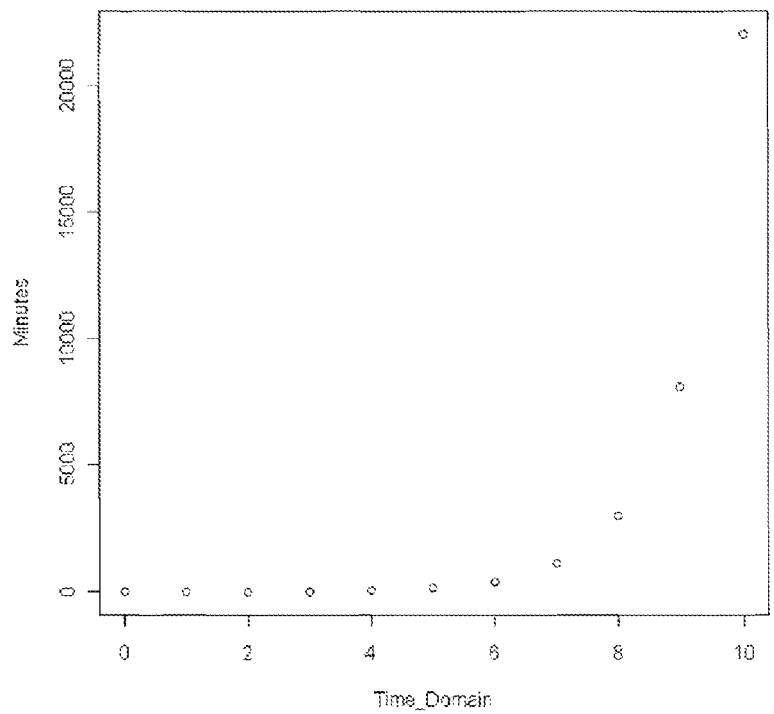
FIG. 5B shows a plot for use in determining the time intervals for table 500 according to an embodiment of the present invention.

FIG. 5B shows a plot 510 for use in determining the time ranges for table 500 according to an embodiment of the present invention. The X axis corresponds to the column numbers. The Y axis corresponds to the time of particular column in minutes. For example, the first column includes times between the first data point at time domain zero and the data point at time domain 1. Due to the large scale of the Y axis, the second data point appears to be at zero, but is simply quite small relative to the maximum value.

The wavelength $\lambda$ of a pattern corresponds to the time range of a column. For embodiments, using time relative to another transaction, then the $\lambda$ is the time between transactions. In one embodiment, 16 time domains (ranges) are selected as follows: $\lambda_o$ is under 1 minute, $\lambda_1$ is between 1 minute and 2.7 minutes, $\lambda_2$ is between 2.7 minutes and 7.4 minutes, $\lambda_3$ is between 7.4 minutes and 20 minutes, and $\lambda_{15}$ is over 1.2 million minutes. In one aspect, smaller time ranges can provide greater accuracy, but can result in more total time ranges, thus using more storage.

The amount values can also be used to determine patterns for transactions of certain dollar amounts. If the amount is not of concern, then the values in a column can be summed to get a total value for a certain time range. The amounts can also be incorporated into the mathematical concept introduced above. For example, in mathematical notation, a value function can be defined as $$V = \sum_W C_w A e^{iwt},$$

where A is an amount of a transaction. Ignoring $C_W$ for the moment, this equation provides $V = e^{In(A)} \cdot e^{iwt} = e^{(iwt+In(A))}$, as $x = e^{In(x)}$. Thus, if the amount ranges are expressed as $In(A)$ then calculations can be performed without performing any exponentiation, since $In(A)$ and iwt both lie in the exponent. In one aspect, to actually obtain the value of V, a time t can be plugged in. But in practice, this does not need to be done as for most purposes, one can just see what wavelengths have the highest values in the matrix elements.

For eight amount ranges and 10 time ranges, the table can be defined as follows. Using group operations, A is defined as: $A = e^{La}$ so $In(e^{La}) = La$, with La being an index that runs 1:8. Therefore V is rewritten: $V = e^{(iwt+In(A))} = e^{(iwt+La)}$. If Liwt is an index from −1:8, then a cycle can be defined as $e^{iwt} = e^{Liwt}$. Therefore $V = e^{(Liwt+La)}$ or $In(V) = Liwt + La$. Accordingly, Liwt and La can be linearly related.

When a transaction is received, the amount and corresponding elapsed time for a particular key pair can be used to determine a corresponding matrix element for the key pair table. The values in the matrix elements can be normalized across one table and across multiple tables. For example, a value can be divided by a sum for all the values of a particular key pair table. Also, a sum can be calculated for all values across multiple tables, and the values for each table divided by this sum. As part of a normalization, the value for a matrix element may be decreased when some of the data used to determine the value becomes too old. For example, for a time range that includes short time intervals, counts from transactions that have occurred more than a year ago may be dropped as being out of data since short timeframe patterns can change quickly.

In one embodiment, the values in the matrix elements can be smoothed. That is the values in one matrix element can be altered (smoothed) to account for values in other (e.g. neighboring) matrix elements. The smoothing can occur independently across time and amount. For example, assume the matrix elements for dollar amount A1 for consecutive time ranges are 0,20,0. These values might cause edge effects in the calculations as the probability jumps up and then jumps down. Therefore, a calculation for a new transaction at the end of the first time range might actually be part of the pattern for the next time range, but this would not be identified.

In one embodiment, the probability for the $1^{st}$ and $3^{rd}$ time ranges can be taken to not be zero but some larger value due to a smoothing of the value 20. The middle bin might get a slightly lower value due to the smoothing. Such smoothing can account for statistical variation in the transaction history. In one aspect, the smoothing is because the matrix elements are not in frequency, but in time. If the matrix elements were in frequency and then converted to time, the conversion would smooth out the function. Instead of the conversion, embodiments can treat the bins as being exactly in the time domain and then smoothing them out in that representation. The smoothing can provide similar results as discussed with the curve near peak 430 of FIG. 4.

In some embodiments, the frequency w can be defined as being inversely proportional to the wavelength $\lambda$: $w \propto 2\pi/\lambda$. In one embodiment, the proportionality constant is 1, which can correspond to elapsed time 0 being considered a maximum probability. In another embodiment, the proportionality constant is 2, which can correspond to elapsed time 0 being considered a minimum probability. Effectively, the time range can be considered the full wavelength or half of the wavelength. Depending on which convention is chosen, the resulting pattern will have a different shape, which can have consequences when the matrix elements are smoothed. In embodiments using time ranges, each matrix element does not correspond to just one frequency, but a range of frequencies. However, a single frequency can be approximated. In various embodiments, the frequency can be from the median frequency for the time range, the frequency for the start of the time range, the frequency for the end of the time range.

In various embodiments, tables for different key pairs can have different time ranges and/or amount ranges. If such differences do occur, the differences can be accounted when a summing operation is performed across the tables.

In other embodiments, specific amount ranges or time ranges can be suppressed. For example, if only certain types of patterns (e.g. only certain frequencies) are desired to be analyzed, then one can suppress the data for the other frequencies. In one embodiment, the suppression is performed with a mask matrix that has zeros in frequency columns and/or amount rows to be suppressed. Thus, one can just multiply the matrices to obtain the desired data. The amount ranges can be similarly suppressed. When suppressing certain frequencies, these mask matrices can act similarly to a high pass, low pass, or notch filters. For example, if one wanted a coupon to be good only for 7 days, and it takes 1 day to create the coupon, the desired time window is any time range that includes those 6 days. Accordingly, the time information for transactions outside the time window can be suppressed as not being of interest.

IV. Organizing Many Tables for Different Keys

As discussed above, tables can be organized as being associated with a respective key pair. For a single consumer, there could be many key pairs that are correlated based on that consumer's transaction history, and that are thus tracked. A single table could be used for all transactions for that person (effectively just one key equal to the person), but to have more finely tuned predictive capabilities, more information can be used. Thus, multiple key pairs can be tracked for the consumer, with the keys including various identifications of where transactions occurred and what was bought. In this manner, a more detailed path to current or predicted transactions can be known. Below are further details on the organization of the keys and tables.

A. Key Hierarchy (which Key Pairs to Track)

As described above, an event (e.g. a transaction) has a set of event data associated with it. The event data can be manipulated to obtain one or more keys that associated with the event. Each key includes one or more key elements, which can be obtained from the event data. The key elements can be combined in numerous ways to obtain keys that are associated with an event. As one adds more key elements to a specific key, the key generally becomes more selective in terms of number of events to which the key is associated.

Example of categories of key elements are: country or other large region (e.g. Europe); zip code of merchant or of consumer; industry code (e.g., travel); product code (e.g., gas, food, etc.); merchant name; consumer or consumer type (e.g. a certain demographic); and date. Different tables can have different lengths for each key of the key pair, i.e. different number of key elements used.

FIG. 6A shows transaction data 600 with example categories of key elements 610 listed according to embodiments. Key K1 620 shows an example key K1 having specific values in certain key element categories of transaction data 600. The key elements include country, zip code, a merchant code, an industry code, account number, and merchant name. Note that the account number and merchant name can be used to identify a particular entity (e.g. consumer or merchant) for which the transaction data may be used to update tables for the particular entity, and can be included in a separate identifier from the key. As another example, the key could be for any consumer or merchant. Thus, one key could then just be US 94566 4812 3.

The US signifies that the country of the transaction is the US. The country typically is the location of the merchant, as opposed to a person's home address when the person is buying over the Internet. The number 94566 is the zip code of the merchant. The number 4812 is the merchant code. The number 3 is the industry code.

Examples of other keys that can be made from the key elements include K2 630 {US}; K3 640{94566}; K4 650 {94566, 4812}, and K5 660 {945**, 4812}, where * is wildcard value. Examples like K5 show that only part of a key element can be used. Using only part of a key element broadens out the key, i.e. makes it less selective. Such broadening can be used to capture more transactions in a table, but also where the data in the key element may be unreliable. For example, the specific zip code may not always be accurate. Also when a merchant name is a key element, the name may be XYZ, XYZ inc., XYZ, inc., or other variations. Allowing wildcards or just suing only part of a key element can accommodate instances when there are some errors or variations in the key.

Accordingly, a single transaction can be represented with many different keys. In particular, if the key elements can be used independent of other key elements, the number of possible categories (e.g., country and zip code) of key pairs is N*N, where N is the number of key elements. For example, <zip code|zip code> or <country, merchant code|zip code> would be different categories. As each of these key elements can have different values, the number of total possible key pairs can be extremely high. Also, the number of key elements can even be larger when key elements are new values derived from the transaction data.

B. Correlation of Keys to Determine which Key Pairs to Track

The total number of possible key pairs (e.g. for every zip code) may be too many to track. Thus, not every possible combination of keys will generally be tracked. For example, key pairs that exhibit a correlation may be tracked. Often, for a table to be tracked, at least one of the key elements (e.g. a consumer identifier or merchant) will be shared by the key pair. In other instances a table may be tracked for very broad characteristics, e.g., a transaction pair from one country to another. However, in such instances, the transaction pair from which an elapsed time is calculated may be for a same account or consumer.

To determine whether to track a certain key pair, a sampling of transactions may be taken to identify transactions that occur often in relation to each other. A threshold can be used to determine whether a key pair will be tracked. Key pairs with long frequencies may require data over long periods of time to determine whether they are significant enough to track. In one embodiment, as long as one matrix element would have a significant value, then the whole table is tracked.

FIG. 6B shows a set 680 of correlated key pairs being tracked for account entity 670 according to embodiments. Key pair 691 tracks patterns of K4 transactions occurring after transactions in zip code 94566 with merchant code 3510 (key is {94566, 3510}. Key pair 692 tracks patterns of K5 transactions occurring after transactions in zip codes 945 with merchant code 3510 (key is {945, 3510}. Key pair 691 tracks patterns of K3 transactions occurring after K4 transactions.

Other entities can have key pair tables tracked as well. For example, a merchant can have transactions tracked via different key pairs. Also, groups of consumers (e.g. by zip code) can be tracked as a single entity. Consumers, demographics (affinity groups), and merchant are examples of entities whose behavior can be tracked using different sets of key pair tables.

In one embodiment, certain consumers may be grouped initially as part of a demographic to obtain more data points in order to identify the key pairs that are correlated. Thus, the transactions of a group of consumers can all be analyzed together to determine correlations of transactions having certain keys. Consumers may even be defined in terms of demographic groups. Besides using just a sampling to determine which keys to track, certain key pairs can be predetermined for tracking. For example, a store may want to have transactions at a specific location (or all locations) tracked.

There can also be a certain hierarchy as to what combination of key elements are tracked as key pairs. For example, there may not be enough transactions to determine correlations for a particular consumer at a specific merchant location within a particular zip code. Thus, the keys may be broadened out to only include the merchant, or only include the industry code. Such broadening can be used to capture correlation when the whole key element may not have enough data to exhibit correlation.

In another embodiment, a broad key may be combined with a very narrow key to obtain specific information, but still ensure enough transaction data to determine statistically significant correlations. For example, certain key element categories, such as country, cover a large number of transactions. Thus, if a very selective key element is desired (e.g., merchant name), then this key element can be paired with the country key element to create a key that has a significant amount of transactions to determine whether correlations exist.

As another example, a key can include a specific time as well. In one embodiment, a key includes time (e.g. 4 hour blocks of a day, day of the week, month of the year) only when the rest of the key elements of the key are quite broad. Examples of broad key elements include all transactions at a merchant, all transactions for a specific affinity group (group of similar consumers), all transactions in the US, or all transactions that have an initial key with US and a final key with Canada, and card not present transactions from US to Canada. Using these broader key elements with a specific key element (like time) can ensure that there will still be a large amount of data for the table to convey meaningful results.

In some embodiments, certain key pairs may also be tracked when the transaction activity is important. For example, if a lot of fraud occurs at specific times, then a key pair may be tracked. Even if there are not a lot of data points, the information for such a key pair is valuable since the consequences are very cost sensitive. As another example, charges for internet dating at certain time and in a certain country can have high instances of fraud. Thus, the specific country and time may be included in a key of a key pair as a significant amount of money could otherwise be lost to fraud.

Transaction activity can also be important when the profit for a particular key pair is high. In such instances, the key pairs can be more selective since the specific knowledge of a selective key pair can contribute significantly to an overall profit. For example, a corporate account for a manager of a performing artist might have a very large amount of purchases, particularly expensive purchases, such as hotel rooms for 20 people. Since the profit is quite large, it is important to have specific knowledge of the transaction patterns. Such knowledge can be used to more accurately and quickly authorize transactions, and to predict when transactions might occur so that incentives (e.g. coupons) can be provided to ensure that the transactions do occur. In all of these instances of important transaction activity, multiple key pair tables may be used for a particular entity.

In one embodiment, the amounts of a transaction can also be correlated. For example, for a certain key pair, the amount of the first transaction to the amount of the second transaction can be correlated. This could be done, for example, by having multiple values per matrix element. Effectively, each matrix element could be a vector. Each value of the vector would correspond to a different amount for the initial transaction of the key pair.

Which key pairs are tracked for different entities can be updated at different times, e.g. at certain fixed times (e.g. periodically) or when certain events occur. For example, every month new data points may be used to add new tables, or remove tables where the correlation is no longer significant. The existing tables can be updated periodically in batches (e.g. every day, week, . . . ), or can also be updated individually after every transaction. In one embodiment, key pair tables may be updated at night relative to where an entity, i.e. merchant or consumer is located.

C. Filtering

As there are numerous tables, each tracking different information for a key pair (or for a larger group of correlated keys), embodiments can provide a filtering mechanism for accessing specific data. In one aspect, the keys and/or key elements are used to retrieve the desired data. As each table has an initial key and a final key associated with it, the keys can be used in a query to retrieve the tables. When three or more keys are associated with a table, there may be intermediate keys, each of which can be used to retrieve tables having a particular key in a particular position.

In some embodiments, a matching function can receive a key and return one or more tables associated with the key. Examples of results include a list of pointers that point to each of the tables associated with that key and the tables themselves. In one embodiment, the matching function involves a query. For example, a key (or a derivative of the key, such as a hash) can be stored with a table (or a pointer to the table) and a query can be placed to find the tables with the associated key. In one embodiment, this could be done by having each key of a pair in a different field of larger object (e.g. a table or other data structure) that includes the key pair table. In another embodiment, a separate lookup table may be used.

A query can include an input key, and all tables associated with that input key can be returned. In various embodiments, the query can specify the level of matching. In one embodiment, the query can specify that all of the key elements of the input key are matched exactly. That is if a country, merchant code, and zip code are entered in the query then only tables that have keys with the exact country, merchant code, and zip code, with no less and potentially no more key elements, are returned. In another embodiment, more key elements may be allowed. In yet another embodiment, the match of each key element may be allowed to not be exact, as described herein.

FIG. 7A shows different queries and results according to embodiments. Query 705 is provided to return tables that are for key pairs with K4 as the initial key. The result 710 shows a list of the tables that are returned from the query. This may be done, e.g., when K4 is an initial event, such as the beginning of a day. See section V.A for an additional description of such events. Patterns in the resulting matrices can then be analyzed to determine patterns in events in relation to a K4 initial event occurring.

Query 715 is provided to return tables that are for key pairs with K5 as a final key. The result 720 shows a list of the tables that are returned from the query. This may be done, e.g., when K5 is a current transaction for authorization is requested. The time and amount of the current transaction can also be used to select out specific matrix elements of these tables. The selected matrix elements can then be used to determine whether the current transaction is of a normal pattern (e.g. high relative value for the matrix elements) for consumer or is unusual (e.g. low relative value for the matrix elements).

Query 725 is provided to return tables that are for key pairs where the zip code 94566 exists as a key element in the final key. One table of result 730 is for <K4|94566>, where 94566 is the entire final key. However, another table of result 730 is for <K46|194566,4812>, where 94566 is only one of the key elements of the final key. Queries can also include requests for both initial and final keys.

In another embodiment, the query can specify that the input key only needs to appear. That is one can specify a zip code, and any key pairs that include the zip code, as well as other key elements, can be retrieved. For example, all transactions for a consumer associated with a certain merchant can be accessed by filtering with the merchant ID. One can require the input key to be the only key element in the final key, as mentioned above. A specific entity can also be included in the query. For example, the tables for a specific consumer can be accessed.

When specified in a query or otherwise, the results of a query can be combined into a single table when many tables are returned. For example, a query for a particular key K2 included in a final key for a particular consumer can provide an aggregation of all of the tables for which the query matches. In one aspect, the result can be equivalent to the table <*|K2>, which corresponds to the occurrence of K2 after any transaction. The aggregated table can be provided by: for each matrix element of the final table, summing the corresponding matrix elements from the returned tables. In this manner, more general patterns can be identified, and more specific patterns can also be tracked and identified. For example, via a filtering mechanism, events that have similar data (e.g. all transactions in the US) can be grouped together. The data can be aggregated to determine a pattern for US transactions.

In embodiments where at least some of the tables have time as a key element, filtering on time can provide behavior at points of a day, week, month, etc. For example, one can filter on a specific transaction occurring at 3 am (or a range such as 1 am to 4 am). The tables of transactions that are correlated to this transaction occurring at 3 am are then selected. In one embodiment, one can filter on initial keys that occur at a specific time. Then, the matrix elements of the returned tables can be used to identify the transaction patterns that occur after such transactions.

In one embodiment, the tables can be indexed by the values of the key elements. The key elements that are numbers can directly specify the corresponding table, which can be a specific element of a multi-dimensional array. For example, array1 (value1, value2, table) can be found with key element of value1 and value2, which effectively point to the appropriate table. The values could be a zip code that runs from the lowest available zip code to the highest available value. However, such a method can have limited functionality and have large storage requirement, particularly when not every possible value for a key element (e.g. every zip code) is being tracked.

In another embodiment, a lookup table is used to identify the one or more tables matching an input key. Each table that is tracked can be entered as a new entry with an identifier (e.g. a pointer or an alphanumeric value) in the lookup table. The lookup table can be dynamic in that a new entry can be entered at any point. Each entry can have the corresponding input key and final key stored in association with the entry, e.g., in a same row. Once a key is matched the corresponding tables can be identified with the identifier. The entries can be organized by what the values of the keys are (e.g. ascending with zip code), but do not necessarily have any particular organization. In one implementation, the keys are a string of the key elements, which can be hashed. These hashes can be stored instead of the raw values of the keys.

FIG. 7B shows a lookup table 740 of key pair identifiers 750, where each key pair number has a pair of hashes 760 and 770 associated with it according to embodiments. If the filter is searching for tables having a particular final key, the column 770 can be searched for the matching hash. This table may be spread across multiple memories, each corresponding to a different processor or set of processors. Thus, access can be easily parallelized. The processor storing an entry can also store the actual key pair table corresponding to the identifier of that entry. In this manner, the identifiers may not be globally unique, but be unique on a particular processor.

In one embodiment, if there is an organization to the hashes, the search can be smarter than simply starting at key pair #1. In such situations a binary tree search (or other level of tree) or other methods can be used. Also multiple tables (e.g. with a hierarchy) can be used. For example, a first table can be used for broader key elements, such as country. Based on the country, another table may be selected, where the another table is for keys that include explicitly or implicitly (e.g. based on the first table) the specified country in the key.

In another embodiment, only one key may be stored when the initial key and the final key are the same. Also, the initial or final key may be a wildcard as any key may match (e.g. when the correlation is from any initial transaction to a specific final transaction).

As mentioned above, an exact match can be required. However, in an event that an exact match is not found (e.g. for a specific key pair), an alignment mechanism may be used to identify a similar matching entry. Examples of when such alignment would be performed include: when a specific key for a current transaction is received, but only a broader version of that key is being tracked; and when two entities are being compared and different key pairs are tracked.

Figure 7C:
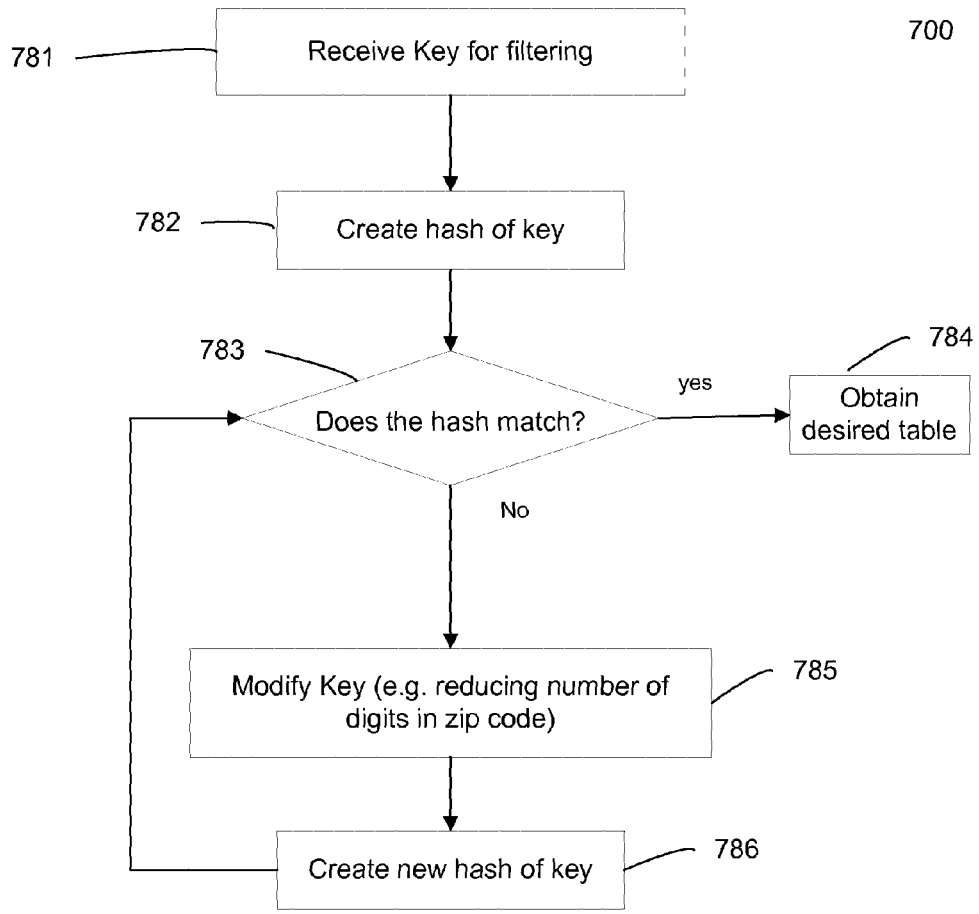
FIG. 7C shows an alignment method for finding a similar key when an exact match for an input key(s) is not found according to embodiments of the present invention.

FIG. 7C shows an alignment method 700 for finding a similar key when an exact match for an input key(s) is not found according to embodiments. In step 781, one or more keys (e.g. both initial and final key) are received for filtering. In step 782, a hash is optionally calculated for the input key(s). The hash would be calculated, for example, when lookup table 740 is used. In step 783, it is determined whether the hash (or just the raw key) matches to a hash in the lookup table. If there is a match, then the desired key pair matrix (or other pattern object) or just an identifier to obtain the key pair matrix can be retrieved at step 784. If there is not a match, then the input key(s) is modified at step 785. For example, the number of digits in the zip code can be reduced from five to four or to three. In step 786, a new hash is created from the modified key, and the method returns to step 783 to find a match of the modified key. The modified key is broader than the original input key, and thus a match is more likely.

In some embodiments, a match is guaranteed. For example, key elements can be dropped until the key is small enough that it matches with at least one key pair matrix that is being tracked. In other embodiments, a stopping point may be determined for the modification (e.g. a minimum size, i.e. # of key elements or total size of the key or of a key element). And, if no match has been found, then the input key may be dropped from the filtering process. In one embodiment, a key is only dropped if another key for the event is still remaining.

In one embodiment, alignment method 700 may occur in mapping function 392 of FIG. 3B so that the mapped keys are ones that are currently being tracked. Such broadening of a key can also help when certain data is missing or unreliable. In other embodiments, keys output from mapping function 392 may be input into another function (e.g. an update module for updating a table, or a scoring (e.g. probability scoring) module for determining a score associated with the transaction data.

Figure 7D:
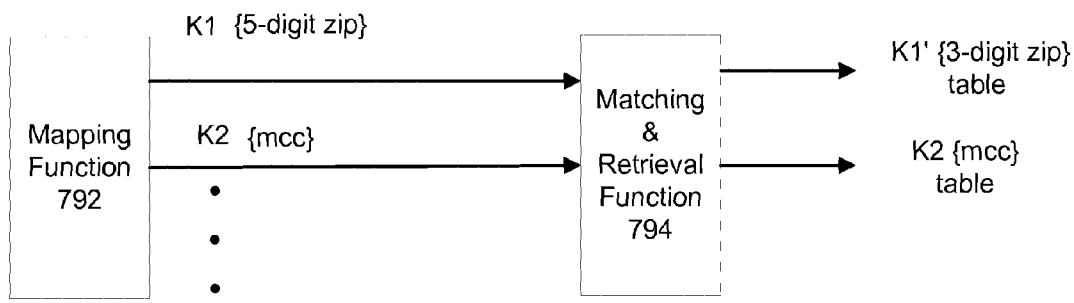
FIG. 7D shows a matching and retrieval module that obtains matching key pair tables based on keys received from a mapping function according to embodiments of the present invention.

FIG. 7D shows a matching and retrieval module 794 that obtains matching key pair tables based on keys received from a mapping function 792 (e.g. function 392 of FIG. 3B) according to embodiments. Module 794 can receive keys resulting from the transaction data and determine whether the keys correspond to existing key pair tables, e.g. using table 740. After the table has been identified, the data for that table may be retrieved. Module 794 can include an alignment (e.g. implement method 700) as part of the matching function to allow similar as well as exact matches.

D. Updating Tables

After an event (e.g. a consumer transaction) is received, embodiments can determine which tracked key pairs have finals keys that match with the keys resulting from the transaction. As a transaction can be associated with many keys and key pairs, a transaction may cause many tables to have a matrix element updated. For example, the transaction may cause different tables for a specific consumer to be updated. The updates could be for one table for all transactions by that consumer (an example of a general table), and more specific tables for particular zip codes, merchants, and other key elements. The transaction can also cause updates of tables for the particular merchant where the transaction occurred. In one embodiment, method 700 can be used to determine which tables are to be updated. As described in a later section, method 700 may also be used to determine which tables to use to obtain the indicia of a pattern from step 370.

As there are different tables that can be updated, each with a different initial key, the time range (and thus the matrix element) that is updated may be different for each table. For example, when elapsed time is used, the last transaction for each table may be at a different elapsed time since the different initial transactions. The transaction amount would typically be the same, thus the exact row for the matrix element to be increased can be the same, as long as the tables have the same amount ranges. But the column (i.e. time) could be different for each table.

Regarding which time column to update, there can also be more than one column updated for a particular table. For example, a K2 transaction may have different time patterns relative to K1 transactions (i.e., <K1:K2> pair). Accordingly, when a K2 transaction is received, elapsed times from the last two, three, or more K1 transactions could be used to update the table.

In a similar manner, one key pair table could be <*:K2>, which includes correlations from a plurality of initial keys to the K2 key in the same table. Effectively, this table could equal the sum of all tables where K2 is the final key for a particular consumer or other entity. However, if the individual key pairs are not significant enough, the <*:K2> table may be the only table that is tracked. Tables of the type <K1:*> could also be tracked.

Figure 8:
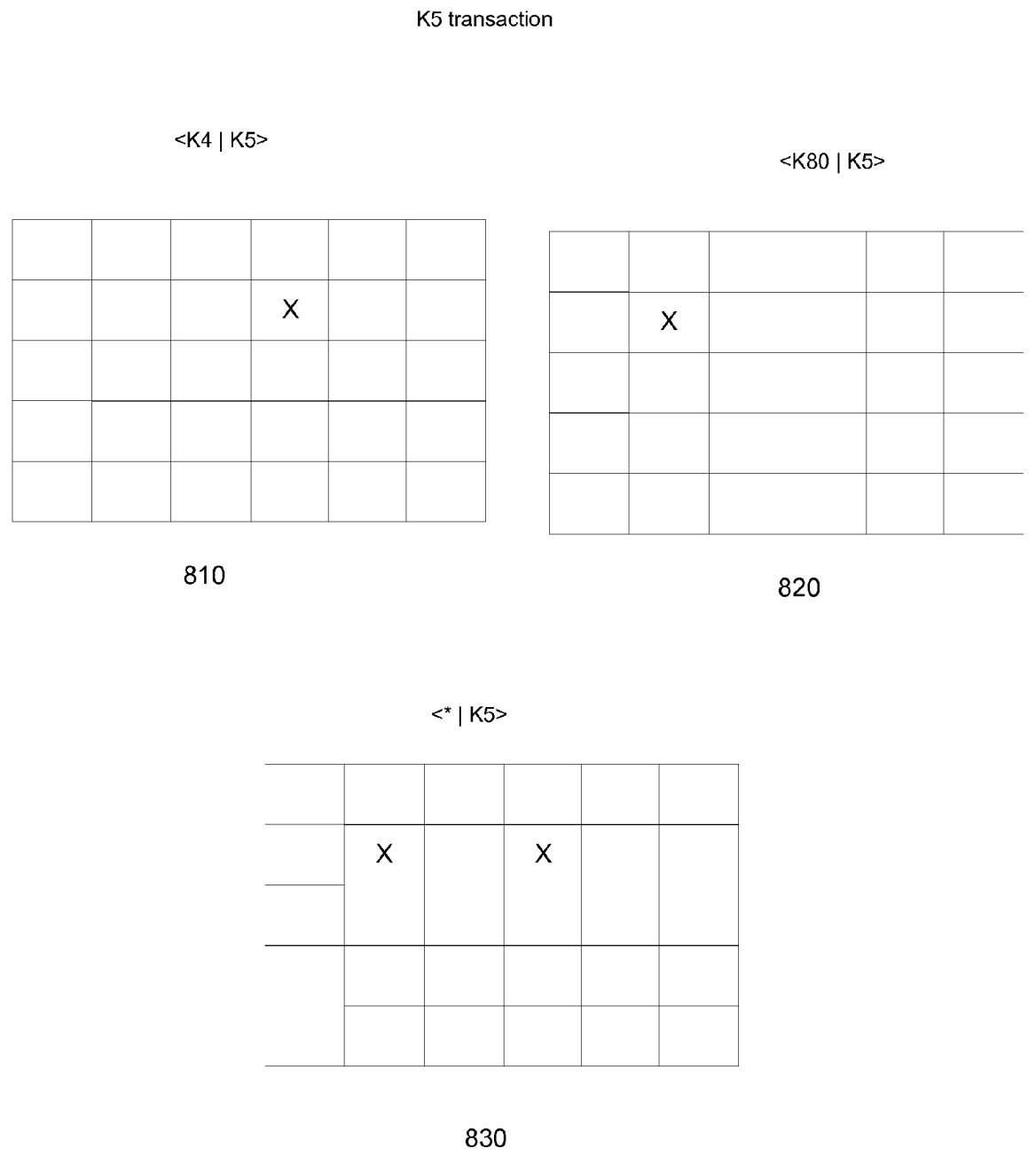

FIG. 8 shows different tables updated for a same K5 transaction according to embodiments of the present invention. For the key pair <K4:K5> table 810, the fourth time range is updated as a result of the K5 transaction. The "X" marks the matrix element being changed due to the K5 transaction. For the key pair <K80:K5> table 820, the second time range is updated for the K5 transaction. For the key pair <*:K5> table 830, both the second and the fourth time ranges are updated, as may occur to account for both the <K4:K5> and the <K80:K5> key pairs. For <*:K5>, the X matrix elements could be increased by different values if there were more than one key pair with K5 as a final key for which the elapsed time was in the second time range.

The tables can be updated right after a transaction is received, at periodic times (e.g. every 10 minutes or once a day), or at other times. Also, different parts of a table can be updated at different times. For example, the high frequency (short time frame) matrix elements of the tables can be generated from a list of recent transactions, which can be stored in a local memory (e.g. RAM). As examples, the recent transactions can be the last N (e.g. 10) transactions or all of the transactions in during fixed timeframe (e.g. the last 24 hours). Other tables or parts of tables can be stored in long term memory (e.g. a hard drive). The different short and long term data can be combined into a table, or if one is interested in only short term or long term patterns, only one set of data can be used. Note that such a decision can be similar to using a mask matrix to select only certain time ranges.

In some embodiments, a time of a transaction may not be exact, e.g., a merchant can batch authorization requests (i.e. not doing them in real time). In these embodiments, a transaction can have more than one time or a range of times. Thus, when an elapsed time is calculated and a table is updated, there can be more than one matrix element that is increased. The increase can be partial since the transaction pair is shared over more than one matrix element.

E. Representative Consumers

As mentioned above, the number of tables being tracked for a consumer can be reduced by only tracking key pairs that show a correlation. Even by such a reduction, there still could be too many tables to track. For example, a consumer could still have 4,000 up to a million possible tables.

In one embodiment, to reduce the number of tables, different zip codes of a consumer could be considered the same. For example, a salesperson might have similar transaction history in cities on his/her route. All of these zip codes can be considered to be equivalent, and thus put into one table. A similar treatment can be made for other key elements. Also, in a similar manner, different consumers can be treated as being equivalent.

As mentioned above, certain consumers can be grouped into affinity groups (demographics) in order to obtain more information about correlated keys. In one embodiment, the affinity groups may be used to define a consumer. For example, if a group of consumers had identical or substantially similar transaction histories then separate tables do not need to be stored. When a consumer of the affinity group made a purchase, the tables of the affinity group could be accessed.

Accordingly, the amount of total storage can be reduced by defining a consumer by his/her affinity groups. Instead of storing the redundant tables for each consumer, just one set of tables can be stored. However, it may be uncommon for a consumer to have the same transaction patterns as a particular affinity group. In such cases, the consumer can be defined as being a linear combination of affinity groups, which are each a combination of key pairs. For example, there can be 100 affinity groups AG. A consumer can be defined as 10% AG 1, 15% AG 23, 30% AG 41, 20% AG 66, and 25% AG 88. A consumer can also have individual tables that are used in combination with the affinity group tables.

A consumer can thus be viewed as a combination of representative consumers (affinity groups). Which representative consumers to use for a particular consumer can be determined by sampling transactions of the consumer. The sampling can be relatively small compared to the total transaction history that would be used if the consumer had his/her own tables. For example, the sample transaction of a consumer can show that he/she has similar transactions to a certain demographic group. The percentage for each affinity group can be determined by a similarity in the tables for the consumer relative to the affinity group.

In one embodiment, the similarity can be defined by taking the difference between each of the matrices (tables) of the consumer from each of the matrices of the affinity group. Where a table exists for the consumer, but not for the affinity group, a table of zeros can be assumed for the affinity group, and vice versa. As an alternative or in combination, an alignment mechanism (e.g. method 700) can be used to obtain more matches between the set of tables for the consumer and the set of tables for the affinity group.

In one aspect, tables for a consumer could be created initially until one or more affinity groups are identified. Certain tables for a consumer could still be kept to ensure that the transaction patterns do not change, thereby causing a need to reevaluate the specific linear combination being employed. Thus, transaction data can be used to determine which demographic a person fits into, as opposed to determining what a demographic is based on similar consumers.

In one embodiment, if no transaction history is available for a consumer, the consumer may be approximated using selected representative consumers. The selected representative consumers can be based on attributes, such as age or residence. In another embodiment, a representative consumer can be built for each zip code. This representative consumer can be used as a default for a consumer living in that zip code, at least until more information is obtained.

In another embodiment, a coupon can be used to probe a consumer to determine if he/she belongs to a specific group. The coupon can be for a certain product and/or merchant that is highly correlated to a certain affinity group. If the customer uses the coupon, then there is a higher likelihood that the consumer is at least partially included that affinity group.

V. Extension to Different Events and Entities

So far, key pair tables have been discussed primarily for tracking transaction history. However, other events besides transactions can be tracked. For example, a certain transaction pattern may occur before and after a major sporting event. Thus, the sporting event can be identified with a key and included as an initial key or a final key, with the elapsed time being measured relative to the sporting event. Additionally, transaction patterns of entities other than consumers can be tracked.

A. Tables Including Events Beyond Transactions

In some embodiments, any two events can be correlated and tracked in key pair tables (or tables for other groups of correlated keys). Each event can have an associated time, and thus as elapsed time between the events can be determined. The associated time does not have to be the instant that the event occurs but at least some measure of time.

In one embodiment, one type of event is the beginning or end of a time period. For example, the beginning of a new year can be an event. The beginning of a day, week, month, or other unit of time can also be used. Typically, the beginning of a time period is associated with an initial key of a table and the end of a time period is associated with the final key. Such events can be used to select different patterns that specifically occur in relation to the event. For example, a person might buy lottery tickets on the 15$^{th}$ of every month.

For tables where the initial key is the start/end of a new time period, the different time ranges (columns) may be of the same duration. For example, for the event of the beginning of a new month, the time ranges may be by day, with up to 31 columns. In order to determine a transaction pattern for a specific month (e.g. March), tables with an initial key of March can be retrieved using March as a filter on the initial key. As an alternative, if the keys for transactions included a date, the keys themselves could filtered for specific dates, but additional analysis might be required. Having starting/ending events for certain time periods can provide a simpler method, all within the same framework.

In some embodiments, for an initial key being the start of a day, each of 6 columns of a table have time ranges of 4 hours. The start of the day could be midnight, 4 am, or any set time. Thus, the behavior of a consumer, affinity group, or other group of consumers can be determined on a daily basis. The exact day can also be part of the key, so that patterns on a weekend can be differentiated from patterns on a weekday. In one embodiment, one simply could provide a query for an initial key of type "start of a time period" and for "Monday" and transaction patterns for Monday can be retrieved. The inclusion of the type of event may be needed if the time period (e.g. day) is included in the tables for other types of events, e.g. transactions.

In another embodiment, the event can be related to the movement of the entity (e.g. a particular consumer) being tracked. The temporary movement of a person to a new city or country may be related to a specific set of transaction patterns. For example, when a person visits San Francisco, France, Europe, or other location, the person may enter a new state (e.g. the tourist state). When a consumer is acting as a tourist, he/she will have the transaction pattern of a tourist.

Knowledge of the movement of the consumer could be identified through the person's mobile phone. As another example, a purchase of plane tickets can be used to identify a specific destination from the transaction data, such an explicit mention of the destination or an amount can be suggestive of the destination. If a person lives on the east coast, one dollar amount could suggest Europe and a larger dollar amount could suggest Asia. Note that the time of the movement may not exactly correspond exactly to the time used in the key pair table. For example, the mobile phone location may not be determined right away. An actual transaction in the destination location can be used to confirm the initial event. The transaction can also be used as the initial event for the movement of the entity.

Other events related to actions of a consumer could be travel to a store (possibly of a specific type, brand, or location) or an act of viewing content (such as movies or radio, even could be selection of a channel). The event could also be an external event, such as the time of a sporting event or election. In each of these examples, the event could correspond to an initial key to determine patterns after the event, or as a final key to determine patterns before the event.

In another embodiment, sending a coupon can be an initial event. The final event can provide a time pattern for when the coupon is used. If the coupon is not used, then that key pair is not tracked. The absence of such a key pair can be used in various instances, e.g., in determining an affinity group of a person.

B. Extension of Tables to Other Entities Besides Consumers

The concept of an entity being tracked has already been briefly mentioned. Mostly, the consumer entity has been discussed. A first consumer can be associated with a set of tables (key pairs) that can define the event patterns (e.g. transaction patterns) of that consumer. These tables may be shared by other consumers. For example, other consumers can be defined by some of these same tables as part of an affinity group (discussed above). However, other entities besides consumers can exhibit patterns.

As events (e.g. transactions) have multiple pieces of data, each piece of data can be associated with a different entity. For example, the account number used in a transaction is associated with a particular consumer. The transaction may also have the name of a merchant, a merchant code, and/or a specific location (store) of the merchant. Each of these pieces of data can be associated with a merchant entity at different levels of specificity. Such a merchant entity can be used to determine transaction patterns for that merchant. The merchant can use such patterns to forecast business needs, regulate inventory (buying and location), modify hiring practices, create sales to liquefy inventory, build/close stores, or any other suitable response. Other entities can include a location or moveable objects, such as a car.

Accordingly, any entity can be defined by the tables created from event data that is associated with the entity. Another example of an entity is a transaction entity. The transaction entity corresponds to the whole universe of transactions, typically having similar key elements, e.g. zip code, month, etc. Tables of the transaction entity can be used to investigate patterns for all consumers. Another entity is a fraud entity. The fraud entity is composed of transactions that have been determined as being fraudulent (e.g. a consumer has made a fraud complaint). The decline of a transaction could also be used. Other entities for other types of events can also exist. For example, all transactions in the U.S. for a certain merchant code can be put into one key of an table to determine an overall pattern for a certain merchant code in the U.S.

In various embodiments, the entities can be associated with particular tables by storing a list of tables for an entity, or the tables themselves can store the entity information. The entity information could be stored as part of the key elements, or as separate fields for a data structure that includes the tables.

VI. Filtering for Relevant Events and Entities

The concept of filtering was previously introduced in order to obtain tables relevant to a particular key. The relevant tables contain the patterns of events, which can then be used to calculate, for example, a likelihood (such as a probability) of a transaction being valid, a transaction being from a particular consumer, and a consumer being part of a specific affinity group. The specific filtering performed depends on the calculation to be performed.

In one embodiment, the filter can be considered an impulse that acts on different entities to identify desired patterns. The impulses are generally derived from an event occurring, and then using that event to retrieve the relevant tables. Such impulses could be the start of a new year. This impulse would filter out the relevant data that is correlated with the start of the year event. Below are some examples of how such impulses could be used.

A. Risk Analysis of Actual Transaction.

In one embodiment, the impulse is a current transaction for which authorization is requested. Such an authorization request would typically be generated by a merchant and sent to a payment processing network (e.g. network 26). The authorization request can include transaction data, such as the account number, merchant code, country, industry code, etc. The payment processing network can determine one or more keys from this transaction data. One or more entities can also be determined. For authorization requests, one entity would normally correspond to the account number or to the consumer in general (i.e. across multiple accounts).

The determined keys along with the entity can be used as an impulse to select out the relevant tables from the entire space of all tables. Such an operation can be performed quickly as the associations of the tables to certain keys and to the entity have been previously stored. The time and amount of the current transaction can also be used to determine the specific matrix elements of each table that are relevant. These values can then be used to determine whether the transaction is one that has occurred with high probability. Probability value(s) (e.g. a sum of the matrix elements or a vector of the probability values) can then be used to determine whether to authorize the transaction. In one embodiment, the probability value(s) are input into a neural net that uses other information to determine an overall risk score, which is used to determine whether to authorize the transaction.

B. Prediction

In some embodiments, the impulse can be a starting event, which can be used to predict patterns occurring after the starting event. For example, as described above, the start of a month (in general or for a specific month) can be used to determine specific buying patterns. Such calculations can be run before or around the start of a month. The start of a month is associated with a certain type of tables, and a prediction calculation can be run for a specific entity (e.g. a particular consumer, affinity group, or merchant). Ending events also can be used similarly to predict what may happen before the event. Since the occurrence of an ending event can be known ahead of time (e.g. scheduled for a particular time), the correlated initial events can still be predicted. For example, consumer activity prior to a schedule sporting event can be determined, which may be done using tables having negative time ranges with the ending event as an initial key or with positive time ranges with the ending event as a final key.

Once behavior is predicted, any number of responses can be made. For example, for a predicted transaction, a pre-authorization can be sent to a merchant at which a transaction is predicted to occur, or a coupon can be sent. In one embodiment, the amount (as a number or as a range) predicted from a table may be used to provide a maximum for which the predicted transaction is authorized. Besides a prediction of a transaction, the input data can also be used to predict other actions, e.g. movements (other events) throughout a store. Such data can be obtained from cameras inside a store as well as through a mobile phone (e.g. using GPS and/or an accelerometer). This data can be part of an initial event or a final event.

C. Prediction after an Entity Enters a State

The prediction calculation was mentioned with reference to a starting event being used to obtain certain patterns. Such an event can be considered causing a particular entity to enter into a new state. For example, the start of December can cause a consumer or a merchant to enter into a state of holiday transactions. Similarly, an event of entering a different location can cause a consumer to enter into a new state, which exhibits a different transaction pattern than when the consumer is at home.

Accordingly, searching a specific event can give the frequency of actions related to a state related to that event. For example, if someone goes to San Francisco, the person might have a certain transaction pattern. The event is entering San Francisco (the time can be to the minute, hour, day, week). To access this pattern, one can perform a search for event pairs that start with San Francisco. Essentially all event pairs <SF:X>, where X is the other event correlated to entering the San Francisco state. One could also search for data on location in transaction key pairs that include San Francisco as a location associated with the transaction.

In some embodiments, specific patterns of transactions when an entity is within a specific state can be accessed by combining different tables. For example, key pairs can be dependent on the state. The key pair can be between two transactions, but with the requirement that both transactions occur while the entity is in the state (e.g. in November). Accordingly, the patterns between transactions specifically in November could be obtained. In one embodiment, to obtain such information, one could apply the filter <Nov| to obtain the tables correlated to this state. These resulting tables <Nov:KF> can be multiplied times corresponding tables that have one of the KF keys as the initial key. For example, the key pair <Nov|K1> multiplied by <K1:K2> can be used to approximate the November behavior of <K1:K2>.

The type of event that the impulse is (e.g. current transaction or starting event) can be used as part of the filter to determine the relevant tables. For example, the type of event could be included as a key element in the key for the event. In this manner, the occurrence of the key element November, can be used as a filter to only obtain events correlated to the start of November and not other instances of the key element November.

VII. Impedance (Likelihood of Another Transaction)

Besides being able to predict when a particular transaction will occur, embodiments can also predict if another transaction is going to occur after a current or a predicted transaction, which is referred to as impedance. In some embodiments, such information can be tracked by using complex numbers for the matrix elements of the final event, with the imaginary part corresponding to the impedance. In other embodiments, the impedance can be tracked simply using another number for a matrix element or using another table.

In such embodiments, the imaginary part of a matrix element can correspond to an impedance that measures how likely it is that another transaction will occur. The likelihood can specifically correspond to a future transaction being correlated to the current transaction having the time range and dollar amount of the matrix element. The real value of a matrix element can correspond to the probability that the KF event will occur, and the imaginary value can relate to the probability that another event will be correlated to the KF event. The imaginary part can be updated when another transaction is correlated to the KF event of the specific time and amount. In one embodiment, a table can have just one impedance value for the likelihood of any transaction occurring later. Thus, just one imaginary part could be stored for an entire table. In another embodiment, the imaginary parts could be different for each matrix element.

In an embodiment, a low impedance (e.g. a large negative imaginary part) for a matrix element means that there is a high probability that another transaction is going to occur, and a high impedance (e.g. high positive value) means that it is unlikely that another transaction is going to occur, with zero being indeterminate. The implication of negative and positive values can be swapped. In another embodiment, a high impedance is provided by a low number (negative or positive), with larger numbers providing low impedance, or vice versa. Certain future transactions can be ignored (e.g. not counted) in determining impedance, for example, if the dollar amount is too low.

In one embodiment, the imaginary number can be tracked (e.g. increased or decreased) in the following way. (1) When a KF event is received, each of the key pair tables that have the transaction as the ending event are increased in real part of the appropriate matrix element, with an elapsed time measured from the respective starting event KI. (2) For each key pair table, the specific KI event to which KF was correlated is determined. Then for that KI event, each K0 event to which KI is correlated as a final event is determined, and the appropriate matrix elements of specific tables are determined using an elapsed time between the specific KI and K0 events. (3) The imaginary part of the individual matrix elements can then be adjusted (e.g. decreased to obtain a reduced impedance) to reflect a higher likelihood that a another transaction follows KI, since the KF event did indeed follow. If all of the matrix elements for a table have the same imaginary part, then the specific KI event does not need to be known, just the tables that have the key for an ending KI need to be known, which can be determined with filters operating on the final keys.

In another embodiment, the imaginary part could be updated in a forward manner. (a) A KF event is identified. Each of the key pair tables that have KF as the ending event are increased for the real part in the appropriate matrix element, with a KI event being the starting event. In one aspect, KF might not have just come in, but could be part of a whole collection of events being processed. (b) Then specific K2 final events that correlate to the KF event as an initial event are identified. (c) Depending on the number of K2 transactions, the imaginary part of the appropriate matrix element can then be adjusted (e.g. increased, decreased, set, or reset). At this point, the imaginary part for just one matrix element (e.g. the matrix element from (a)) of tables for KF could be determined. Or, all of the other matrix elements of the tables could also be determined as well based on the value for the specific matrix elements just determined. For example, all of the other matrix elements of a table can be updated to reflect that the K2 transaction occurred. This can be done when all of the imaginary parts are the same, or if just one value is stored for an entire table.

In one embodiment, the default for the imaginary part can be set at zero or some average value for a likelihood that a transaction occurs. If after a certain amount of time, there are no transactions correlated to it, then the value might increase and continue to increase. Or the default could be set at a high impedance, and then lowered as more transactions occur. In another embodiment, if the future transaction is fraudulent, then the complex part can also be changed to reflect a higher impedance since a valid transaction does not occur. In another embodiment, if a decline occurs after a transaction then the impedance is increased (e.g. the imaginary part is decreased by one), if an acceptance occurs after a transaction then the impedance is decreased (e.g. the imaginary part is increased by one).

In this way, one can determine the specific instances where the transaction is a dead end (i.e. not leading to other transactions), and other instances where the transaction leads to other transactions. A high impedance would convey that the transaction is a dead end as no further transactions occur very often. Conversely, one can determine that a transaction is a gateway to many other transactions when it has a low impedance. In one embodiment, an average or sum of all of the imaginary parts of the matrix elements can be used to determine whether any future transaction is likely.

Some embodiments can aggregate the imaginary part over all KI correlated to a KF to determine a total likelihood that a KF will provide more transactions. Thus, one can incentivize KF if the likelihood is high. Each of the tables with KF as the final event can be used to determine exactly when to send an incentive and what the incentive might be.

In one embodiment, one can see a dead end for one affinity group, but then look at another affinity group that does not show this dead end. An analysis can then be made as to why the one group dead ends, and strategy developed for causing the dead end not to occur (e.g. sending a coupon, pre-authorization, or other inventive). For example, one can identify stores that the one affinity group does go to after the transaction, and send coupons to that store. As another example, one can identify stores geographically near a merchant that is a dead end and send a coupon for a nearby store, even potentially for use within a short time period after a predicted visit to the dead end merchant. After seeing if a strategy works by sending coupons to a couple people in an affinity group, coupons can be sent to more people in the affinity group (including people just partially in the affinity group).

Instead of or in addition to the above use of imaginary values for impedance, greater impedance can also correspond to fraud. If a fraud transaction K2 is found to correlate to a transaction K1, then the <KI:K1> matrix elements (or just a specific element) can have the impedance increased. Thus, the impedance can reflect the profitability of the present transaction. For example, certain transactions happening right after buying a concert ticket can be associated with fraud, which is an example of where each matrix element may have its own complex part.

In some embodiments, both real and imaginary parts of a matrix element can contribute to an overall value, which provides whether the transaction is a good transaction with regards to likely occurring or being a transaction that leads to other transactions. Such transactions can be encouraged. In other embodiments, values for the real or the imaginary components can be analyzed separately.

VIII. Calculation of Indicia of Patterns

Once the relevant patterns (e.g. key pair tables resulting from a filtering process) are obtained, the patterns can be analyzed to provide indicia (e.g. a likelihood) for specific events. The indicia can be used to determine a total likelihood (e.g. whether a transaction is fraudulent or a person belongs to a particular demographic), from which a course of action can be determined (e.g. whether to authorize a transaction event).

The calculation of the indicia can be performed in numerous ways. In one embodiment, the indicia can include specific matrix elements corresponding to a current transaction. The matrix elements can be modified (e.g. normalized) and/or summed to provide an overall indicia. In another embodiment, the indicia can be operated upon (e.g. summed or added with other values). This section describes some embodiments for obtaining relevant indicia of a likelihood for an event from certain event patterns.

A. Determining Similarity of Transactions to Established Patterns

One likelihood of interest is whether a specific transaction fits established transaction patterns of a consumer. Such a likelihood can be used to predict transactions, authorize a current transaction, or many other uses, some of which are explicitly mentioned herein. To determine a likelihood, the current transaction can be compared to established transaction patterns.

In an example where one or more recent transactions are received, these recent transaction(s) can be compared to established transaction patterns of the consumer or other entities (e.g. fraudsters or a specific demographic). Such a comparison may be done as part of a determination whether to authorize a recent transaction. For example, if the transaction is similar to the established patterns of the consumer, then there is a greater likelihood of authorizing the transaction. Conversely, if the recent transaction is similar to the long term patterns of a fraudster, the likelihood of authorizing the transaction is less. The established patterns can be created from previous transactions that are known or assumed to be associated with a particular entity.

In one embodiment, a time interval between a recent transaction associated with a key KF and one or more other transactions associated with a key KI can be determined. Using methods described herein, one can obtain the <KI:KF> key pair table, created from KF transactions that have previously been correlated to KI transactions. For example, the keys KI and KF can be used to query the established tables for a consumer to obtain the <KI:KF> key pair table.

The time interval and potentially a dollar amount can then be used to select the appropriate matrix element. This matrix element, potentially along with the other matrix elements of the retrieved matrices can provide a likelihood directly or in combination with other values. For example, the matrix element can be divided by a sum of matrix elements in a row, all matrix elements in a table, or all transactions of a person to determine a likelihood for the recent transaction. The appropriate matrix element(s) can be selected using multiplication.

FIG. 9 shows an example of obtaining indicia of a similarity of a recent transaction relative to an established transaction pattern of a consumer according to embodiments. In FIG. 9, a short-term table 910 created from one or more recent transactions is multiplied (element by element) by pattern table 920 to provide indicia 930. Indicia 930 can provide a measure of how similar the short-term table is to the pattern table 920, and thus how likely that it is for the recent transaction to have occurred.

In this simple example, suppose the recent transaction is associated only with K1, and K1 is correlated only to K2. Then a table <K2:K1> can be created with a "1" in the proper matrix element of table 910 relative to the last K2 transaction, with zeros in the other matrix elements. Table 910 shows a value of 1 for the first dollar amount and the fourth time range. Then, short-term table 910 can multiply the <K2:K1> key pair table 920 (which has been matched and retrieved), with the result selecting out the matrix element that matches the short-term matrix element, in this case "2". The value of this matrix element 930 can (e.g. when normalized) can provide a measure of a likelihood of the K1 transaction at that specific time. Since "2" is relatively low compared to the other matrix elements, the likelihood of the K2 transaction occurring with the specified dollar amount is relatively low. Note that the likelihood can be determined only based the matrix elements in the same row.

In another embodiment, pattern table 920 can correspond to a pattern of fraud. Thus, the indicia 930 having a value of "2" this can be seen as a low likelihood of fraud relative to the other times. However, if the matrix element was the largest value in the table, then the recent transaction K1 can be seen as having a higher likelihood of fraud.

Overall, multiple short-term tables might result for a current K1 transaction. Also, a single short-term table could have multiple matrix elements with a "1" or other value to signify that the time interval between transactions falls within the specified time range. Multiple recent transactions may also be used to determine the likelihood for the K1 transaction. For example, if other recent transactions are not likely, then they may affect the likelihood of the most recent transaction. Such use of other recent transactions may be used in any embodiment.

B. Multiplying Tables—Alignment

There may be instances where the key pair for a short-term table is not found in the key pairs of an established pattern tables. When this occurs, a short-term table may be aligned with an established pattern table to determine a matching table for multiplying. In one embodiment, method 700 can be used to perform the alignment.

Figure 10:
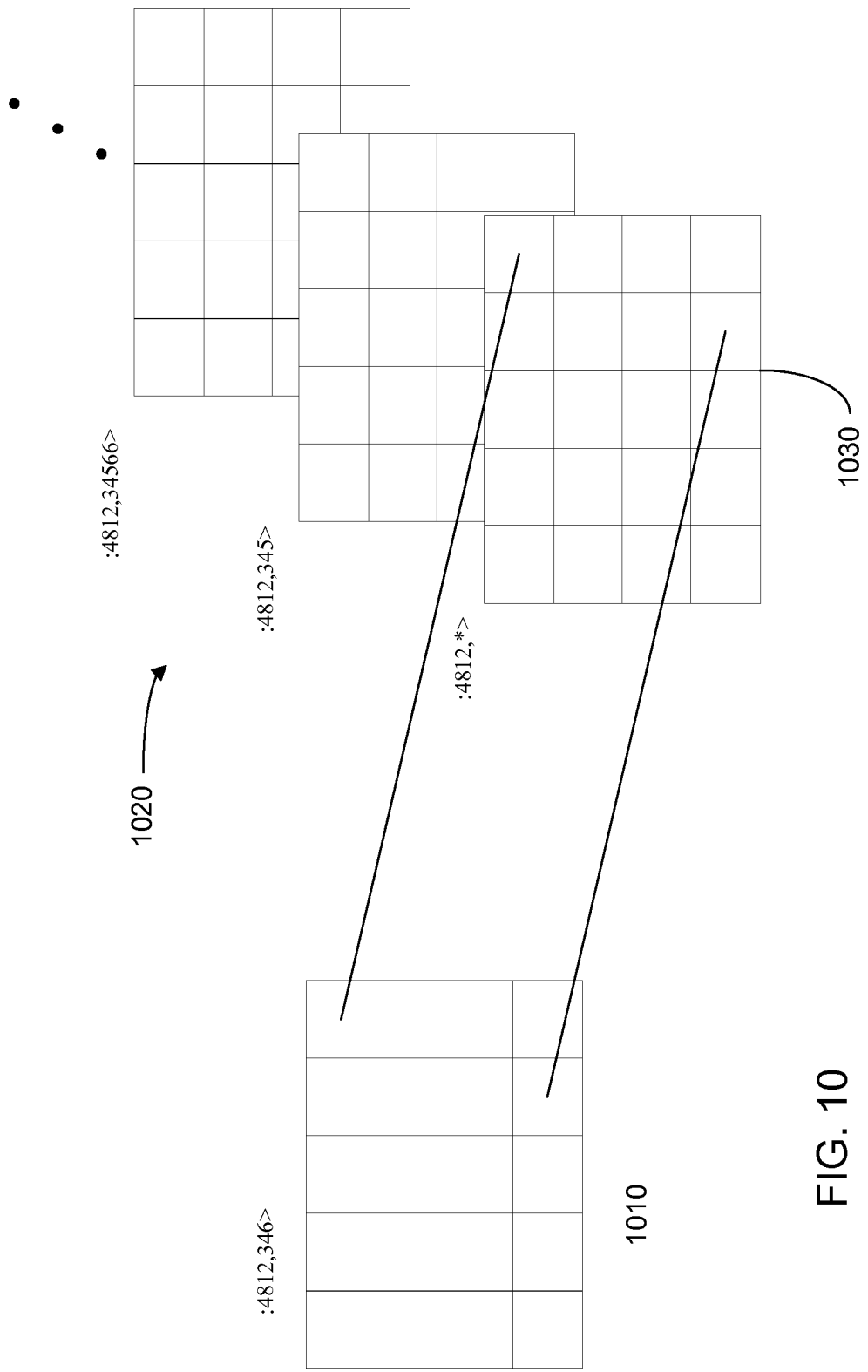
FIG. 10 illustrates the alignment of a short-term key pair table with established key pair tables according to embodiments of the present invention.

FIG. 10 illustrates the alignment of a short-term key pair table 1010 with established key pair tables 1020 an according to embodiments. Short-term table 1010 can be created based on one or more recent transactions of a consumer. In one embodiment, short-term table 1010 can be generated when the multiplication is to be performed, and is not already stored. Whereas, established key pair tables 1020 can already be stored, e.g., in RAM or disk. For simplicity, these tables are shown only with the final key (but the example applies equally well to an initial key). In one aspect, the initial keys for all of the tables shown can be the same key, e.g., K1. In another aspect, the initial keys can be the same as the final keys.

Short-tem table 1010 has a final key of :4812,345>, where 4812 is the merchant code and 345 is the first three digits of a zip code. However, the key pair tables 1020 do not contain a table with this final key. This may be because the consumer has few transaction in zip codes starting with 345. But short-term table 1010 may still contain useful information. Thus, the key :4812,345> can be broadened to be :4812,*> so that it matches with table 1030. The zip code can be broadened in one step or incrementally to :4812,34>, :4812, 3>, and then :4812,*>, where a match is found.

Such alignment can be performed between sets of key pair tables. In one embodiment, each set can correspond to a different entity, e.g., two different consumers. In a general sense, a set of key pair tables can be viewed as a key manifold. When the key manifolds are normal (i.e. both spaces have identical amounts of keys), then one can apply the operations directly. However, if the key spaces are not normalized (as in the example of FIG. 10), then an alignment may be performed, as described herein.

In one embodiment, each table of one manifold is aligned with exactly one table of the other manifold. In another embodiment, there may not be a match found for a table from one manifold to another. In such a case, the non-matching tables can be dropped, or distinguished from tables that did match after alignment. A distinction can also be made between tables that only match after alignment and tables that match exactly. For example, it may be useful to know what the entities do that is not the same (no match), or maybe just similar (match after some alignment).

Also, other operations besides multiplication can be performed, such as division, subtraction, and addition. In some embodiments, alignment is not needed. For example, different tables may be added with a final key being the intersection of the keys (e.g. the broadest key the tables have in common). As another example, after summation, an association with a specific key can be dropped.

C. Other Calculations of Likelihood

With this framework of aligning and multiplying keys, more complicated calculations of likelihood can be performed. As mentioned above, other operations, such as division can be used. A purpose of division can be to normalize a key manifold (i.e. a set of tables).

Figure 11:
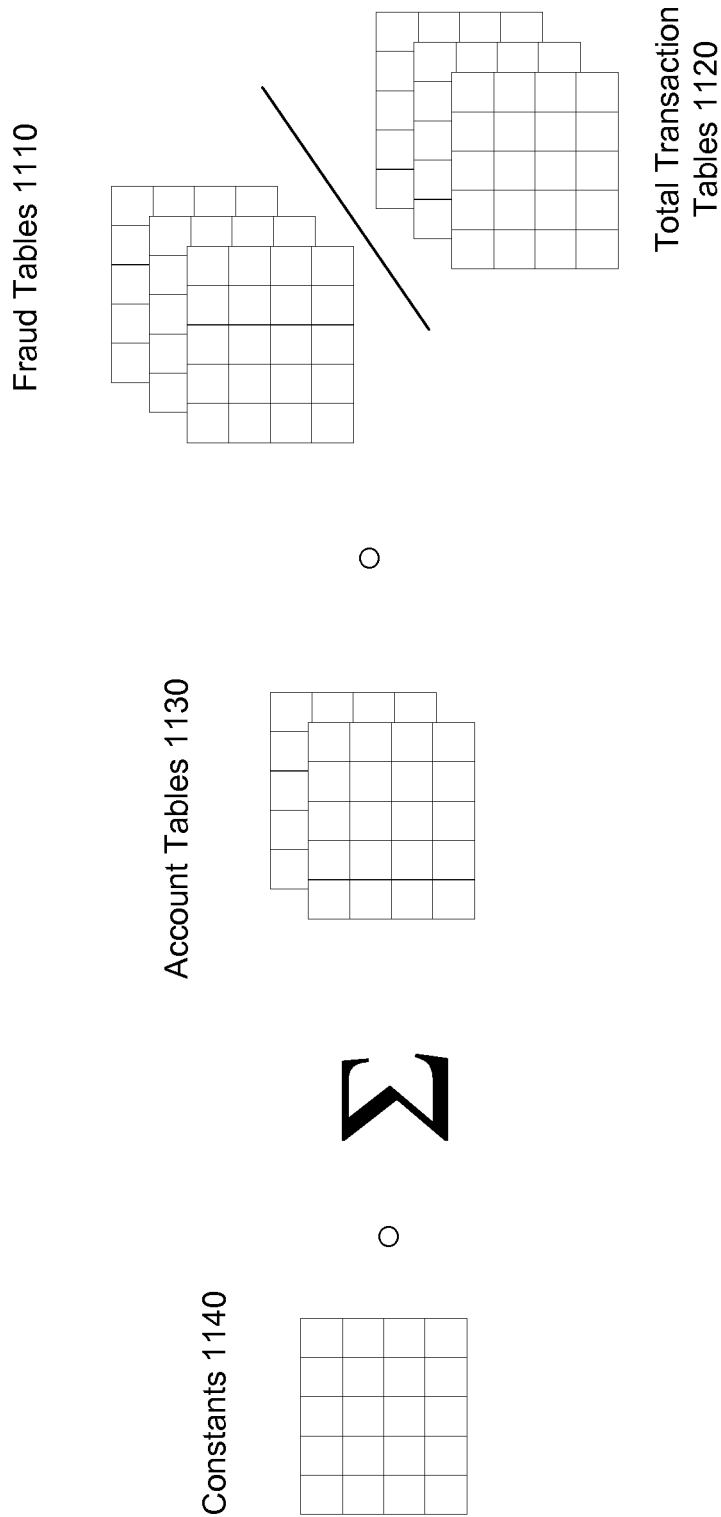
FIG. 11 shows a calculation of a likelihood that a transaction or set of transactions are similar to established patterns according to embodiments of the present invention.

FIG. 11 shows a calculation of a likelihood that a transaction or set of transactions are similar to established patterns according to embodiments. Such a calculation can provide a likelihood of occurrence of a transaction. Fraud tables 1110 and total transaction tables 1120 are established pattern tables, which can be updated at set times, e.g., once a day, week, etc. Account tables 1130 are short-term tables created from the transaction or set of transactions. The constants table 1140 is a table that can be used for normalizing, e.g., to place the values of a table to be within a specific range.

Fraud tables 1110 can be obtained from fraudulent transactions across all or many entities. In one embodiment, the specific set of tables have a common key element, e.g., all fraud for a specific merchant or during a specific month. Other key elements can be used, e.g., zip code, country, or any other suitable key element. The fraud tables selected may be ones that have a significant amount of fraud. For example, a transaction from one zip code to another zip code far away within a short time frame is likely to be fraud.

Total transactions tables 1120 can be obtained from all transactions across all or many entities. In one embodiment, the total transactions tables 1120 are obtained from the same entities as the fraud tables 1110. Similar to fraud tables 1110, total transactions tables 1120 can share a same key element, for example, the same key element as in fraud tables 1110. The total transactions can include fraudulent transactions and valid transactions, or just valid transactions. The fraud and total transactions tables can be computed in a batch at prescribed times, e.g., every day, week, month. The number of fraud and/or total transaction tables can be quite high, e.g., 10,000 to 500,000 or more.

In an example where the fraud tables 1110 and the total transactions tables 1120 include transactions for a particular month, there may be fewer fraud tables than total transaction tables. This may occur since not all key pairs may have a significant enough fraudulent transactions to have a certain key pair table tracked. In such instances, the fraud tables that are being tracked can be aligned with the total transaction tables.

Once the tables are aligned, the total transaction tables 1120 can be used to normalize the fraud tables 1110 by dividing a fraud table by the corresponding total transaction table. After the division, the normalized fraud tables can be stored in RAM (or any other memory with faster access than disk). As with FIG. 9, the division operation divides each matrix element of a fraud table with the corresponding matrix element of the total transaction table. The division can provide a normalization of the counters for the fraud tables. For instance, a particular fraud table may have high values, but if there are many total transactions, the total percentage of transactions that are fraudulent is low. Thus, the likelihood of a fraudulent transaction is low.

In one embodiment, each fraud table is aligned with exactly one transaction table. For example, if there are 100 fraud tables tracked (i.e. for a given group having a common element, such as month), then 100 tables result from the alignment and division. Note that the alignment can be implicit in the notation of a division operation. In some embodiments, there may not be a match of a fraud table to a total transaction table, although this may happen rarely. In such a case, the fraud table may be dropped, and thus there may be fewer resulting tables than fraud tables. In an embodiment, one can differentiate fraud tables that do not have a match from tables that did match, or between tables that only match after alignment and tables that match exactly.

Account tables 1130 can be created from a plurality of recent transactions, e.g., as fraud tends to happen in bunches of consecutive transactions. Regardless of how many recent transactions are used, multiple account tables can result. For example, one transaction can have a key that is correlated to multiple initial keys. Thus, a plurality of short-term key pair tables can be generated. An account table can have a form as described above for table 910. In various embodiments, mapping module 392 and/or a matching module (e.g. module 794) can be used to determine which short-term key pair tables are created.

Account tables 1130 can then aligned with the normalized fraud tables. Before alignment, some or all of the account tables can be summed. In one embodiment, two account tables can be summed when the keys are similar. In effect, the final transactions for each of the tables can be considered to be of a same type, i.e. have the same key. For example, if the merchant is the same, but the zip codes are different, the two tables can be merged and the zip code dropped or broadened (which can be considered an intersection of the two key pair tables). This summing may be particularly appropriate when both tables would be aligned with a same fraud table. In such a case, a summing after multiplying the account tables by the normalized fraud tables provides the same resulting table.

After alignment, the account tables can be multiplied element-by-element with the normalized fraud tables, thereby providing a plurality of account-fraud tables. In one embodiment, these account-fraud tables can be summed to provide one final table. In one aspect, the summing can be due to the fraud tables 1110 being grouped to have a similar key element, and thus the final table can relate to the one key element. This final table can provide an overall similarity of the transaction patterns to certain types of fraud, and therefore can be used (e.g. by a modeling function as mentioned in step 380 of method 300) to determine a likelihood of whether a transaction is actually from the consumer. In another embodiment, each of the account-fraud tables can independently be final tables that are used by a modeling function.

In one embodiment, if an account table cannot be aligned (i.e. there is no corresponding normalized fraud table), then an average value of fraud can be used. In various embodiments, this average level of fraud is single number that multiplies the account table, is a table of average values, and can be the same across all fraud groups or just the same within a single fraud group.

In another embodiment, a mask matrix can be used to remove certain matrix elements from the account-fraud tables or from the final table. For example, the mask matrix can remove low frequency or high frequency components, or be a notch filter to select frequencies in the middle. Also, certain dollar amounts can also be removed. In one implementation, the mask matrix has 1s in matrix elements that are to be kept and 0s in matrix elements that are not to be analyzed.

Although fraud tables 1110 were normalized, the final table(s) may still have matrix elements with values that can vary widely. This variation in values can cause instability in a modeling function, which uses the matrix element as indicia of the patterns to obtain a total likelihood. Accordingly, in some embodiments, constants matrix 1140 is used to constrain the final matrix element to be within a certain range of values, e.g., between −1 and 1 or 0 and 1. In one embodiment, constants matrix 1140 is created from a specified functional form, such as tan h, log, or sigmoid (generally S shaped) functional form.

Constants matrix 1140 can also constrain matrix elements values to correspond to a third number within the prescribed range. For example, a zero output can be mapped to a matrix element value where fraud and valid transactions may be more difficult to determine and thus sensitivity needs to be greater. In one embodiment, the functional form of constants matrix 1140 can be kept for an extended period of time, where inputs of specific matrix element values (e.g. maximum and minimum values in a specific table) are used to determine the exact values. Which count corresponds to zero may also have an input parameter. The functional forms may be constant or vary across multiple entities.

The calculation shown in FIG. 11 can done for different groups of fraud tables, e.g. one group shares a same merchant, one group shares a month, etc. In such embodiments, the account tables used for a particular group can be chosen to correspond with a particular group. Thus, different account tables can be used for different groups. In one embodiment, each of these calculations can then be combined and provided to a model function that uses the inputs to determine a risk score related to whether the transaction is fraudulent or not.

Instead of or in addition to the comparison to fraud, one can also add a calculation involving the established transaction pattern of a consumer. In such embodiments, the fraud tables can be replaced with the established key pair tables of the consumer. The multiplication operation can then provide a measure of how likely the recent transactions fit the consumer's pattern, and thus can contribute to a determination of whether a transaction is from the consumer. A higher similarity to the established pattern can signify a higher likelihood of the transaction being valid. The final results from the fraud comparison and the consumer comparison can be analyzed separately or both be input to a same modeling function that accounts for the respective values.

The form of the formula in FIG. 11 can also be used to determine how likely a consumer is part of an affinity group. Instead of the fraud tables, the key pair tables of an affinity group can be used. Normalization can still be performed with total transaction tables for the specific affinity group or transaction tables across multiple affinity groups. The account tables can still be made of just recent transactions, or can be tables for established patterns of a consumer. The tables can be normalized as well.

In one embodiment, the normalized fraud tables (and potentially the account tables) can be stored across multiple processors and each one can perform the corresponding multiplication if there is a match to an account table. As an alternative, a query can be provided to each processor and the processor that is storing the desired fraud table can return the requested table. The final table(s) can be provided to a single processor or set of processors that are configured to run a modeling function.

D. Subtraction of Matrices

Besides comparing different entities by multiplying their respective key manifolds (sets of key pair tables), the manifolds can also be subtracted from each other. Each table (which can be normalized) can be aligned and the elements subtracted. If the difference is large, then the two manifolds are less likely to be part of the same affinity group. Embodiments can also analyze tables that do not match exactly, and ones that match only after an alignment procedure. The values of these matrices can be analyzed along with the differences for the tables that did match.

E. Prediction

In embodiments that predict a likelihood of a future event, one can obtain the relevant key pair tables for the entity (e.g. a consumer) and then analyze these tables. Which tables are obtained and how they are analyzed depends on exactly what events are trying to be predicted, i.e. the question being answered.

In one embodiment, if one wants to identify when a particular event E is likely to occur, the event can be represented with one or more keys KF. These keys can then be used to filter key pair tables having a final key that matches a KF key associated with the event E. The result being a set of tables <KI:KF>, where each KI event is correlated with event E. At this point, one can analyze the tables to obtain the time ranges for event E that are most likely (e.g. the ones having the highest values), but these time ranges are elapsed times from KI events. In order to obtain an actual (absolute) time and date, one can obtain time information for the KI events. In this way, the contributions of the likelihood from each table can also be combined since a same absolute timeframe can be used; whereas with elapsed time, the timeframes for each of the tables could be different. If a dollar amount is specified for the E event, then a specific matrix element in a time range (e.g. a column) can be identified. If any amount is allowed, then all of the matrix elements in a column can be used.

In another embodiment, if one wants to identify which events are likely to occur after an initial event E, the event can be represented with one or more keys KI. These keys can then be used to filter key pair tables having an initial key that matches a KI key associated with the event E. The result being a set of tables <KI:KF>, where each KF event is correlated with event E. For each KF event, one can then obtain the elapsed time that is most likely by choosing the matrix element with the largest value. If one wants additional information of a likelihood of a particular KF event, embodiments in the previous paragraph can then be employed.

In addition to determining when a KF event is likely, a calculation of a likelihood that such a KF event is related to fraud can also be determined. For example, after determining that a KF event is likely at a particular time, any action (e.g. sending a coupon) might also depend on whether such an event could be fraudulent.

IX. Method for Likelihood for a Specific Transaction

Figure 12:
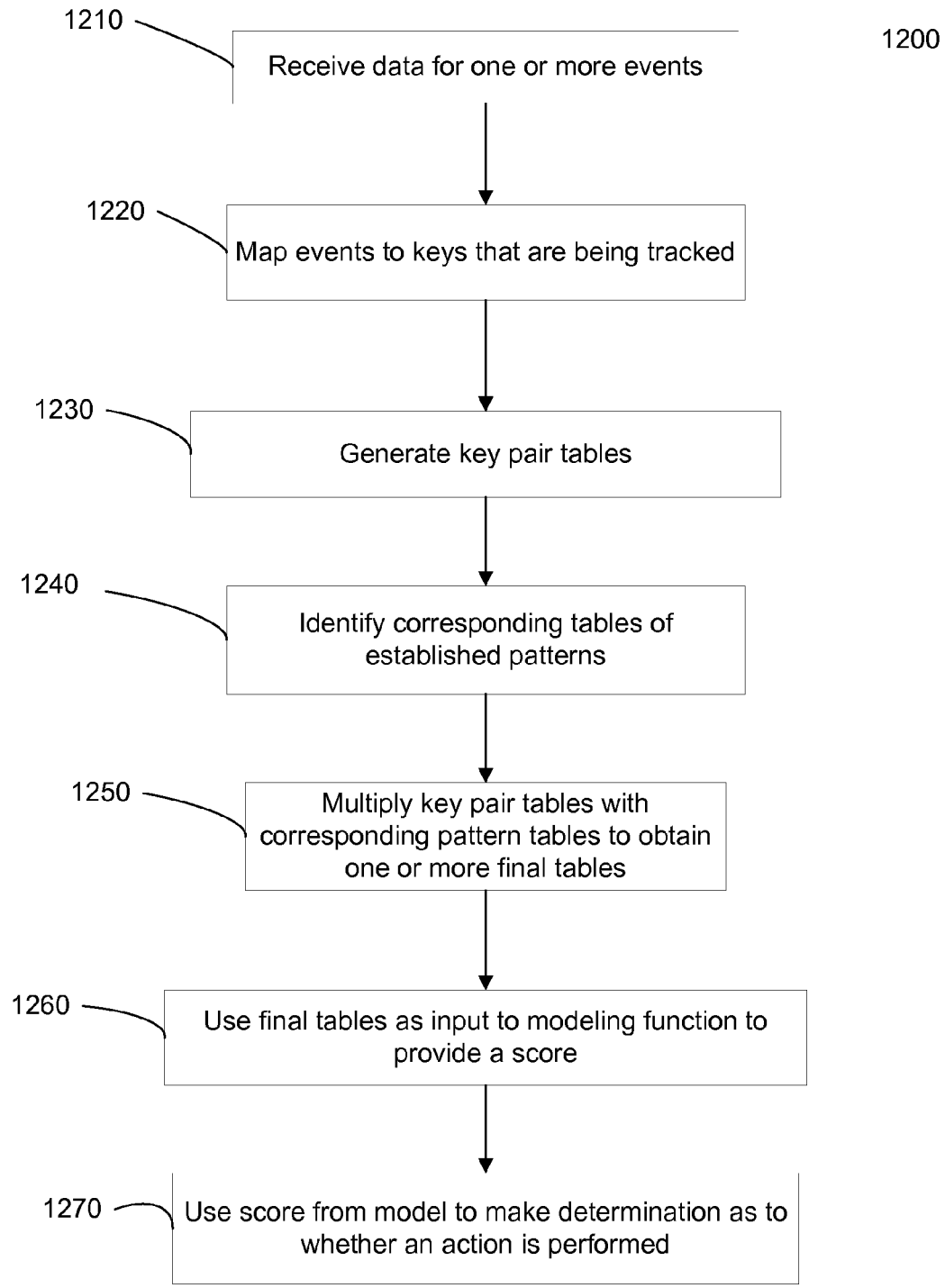
FIG. 12 is a flowchart of a method for determining a likelihood of events for which data has been received according to embodiments.

As stated above, embodiments can be used to determine a likelihood (e.g. a risk score) that an event (e.g. a transaction) is fraudulent, a likelihood of an entity being similar to a demographic, a likelihood of an event occurring, or any other likelihood measure. FIG. 12 is a flowchart of a method 1200 for determining a likelihood of events for which data has been received according to embodiments. Method 1200 can be performed by any one, plurality, or combination of computer apparatus described herein, and components thereof.

In step 1210, data for one or more events is received. In one embodiment, the event data (e.g. transaction data) is associated with one entity, e.g., a particular consumer or affinity group. The event data may be for only recent events, or for just old events, or a combination of both.

In step 1220, the event data is used to map each event to one or more keys. In some embodiments, the mapped keys are specifically keys that are being tracked, for example, for the consumer, an affinity group, or a fraud entity. In one embodiment, the mapping is performed by mapping module 392 in FIG. 3B, which can also ensure that the mapped keys are specifically keys that are being tracked for a particular entity.

In step 1230, key pair tables (e.g. tables 1130) are generated using the keys and time information of the events. In one embodiment where the events are recent, the key pair tables have a final key matching one of the keys resulting from step 1220 are obtained. Such an embodiment can be performed when an authorization is requested.

In step 1240, tables of established patterns that correspond to the generated key tables from step 1230 are identified. The corresponding tables may be associated with a same entity as the key pair tables in step 1230. For example, the corresponding tables may be the established event patterns for a consumer. In other embodiments, the corresponding tables are for an affinity group or for a fraud entity. The corresponding tables may be a combination of tables, e.g., fraud tables 1110 divided by total transaction tables 1120. In one embodiment, matching and retrieval function 794 of FIG. 7D identifies the key pair tables using methods described herein. In another embodiment, an established pattern table is required to have a certain total of all values, average of the values, minimum value in any matrix element, or other measure of the values in the table. Such a requirement can ensure that enough data has been received to provide an accurate pattern.

In step 1250, each generated key pair table is multiplied by a corresponding established pattern table, thereby providing a plurality of resulting tables. In one aspect, each matrix element of one table is multiplied by a corresponding matrix element of the other table. These resulting tables can be summed into one final table, only some of the tables can be summed, or not summed. In one embodiment, the final table(s) are multiplied by a table of constants to transform the matrix element values to be within a predetermined range of values.

In step 1260, at least some of the values of the final tables are used as input to a modeling function, such as an optimization algorithm or a decision tree. The matrix elements of the final tables can be separately input to the modeling function. The modeling function can analyze the final tables to determine a score, such as a risk score for the event being fraud or a similarity score for the generated key pair tables being similar to the pattern tables (e.g. to see if a person is part of an affinity group).

In step 1270, the score is used to determine whether a certain action is performed. For example, if a risk score is above a certain value the event can be considered to valid, and not fraud, or vice versa. A level of validity or fraud can depend on the specific values of the score. The risk score by itself or other factors can be used by an authorization entity (e.g. an issuer or a payment processing network) to determine whether or not to authorize the transaction. As another example, the score can also be used to define the consumer as being a certain percentage of an affinity group.

In embodiments where the score includes a similarity to the transaction patterns of a consumer, a person may be allowed to enter incorrect information (e.g. mistype a zip code), but the system will still authorize the transaction when the transaction fits established patterns. Some embodiments can even have a requirement of entering the zip code to be actively removed after a swipe of a card if the likelihood is sufficiently high. In one embodiment, challenge questions can be determined based on a value of the score.

X. Method for Prediction of an Event

As opposed to calculating a likelihood for an event that has already occurred, certain embodiments can also predict an occurrence of a future event (e.g. a transaction). Based on the prediction, embodiments can perform an action, such as pre-authorizing a predicted transaction, sending a coupon to use for a predicted transaction or to incentivize a transaction when the likelihood of occurrence is low, and actions related to inventory of a business.

Figure 13:
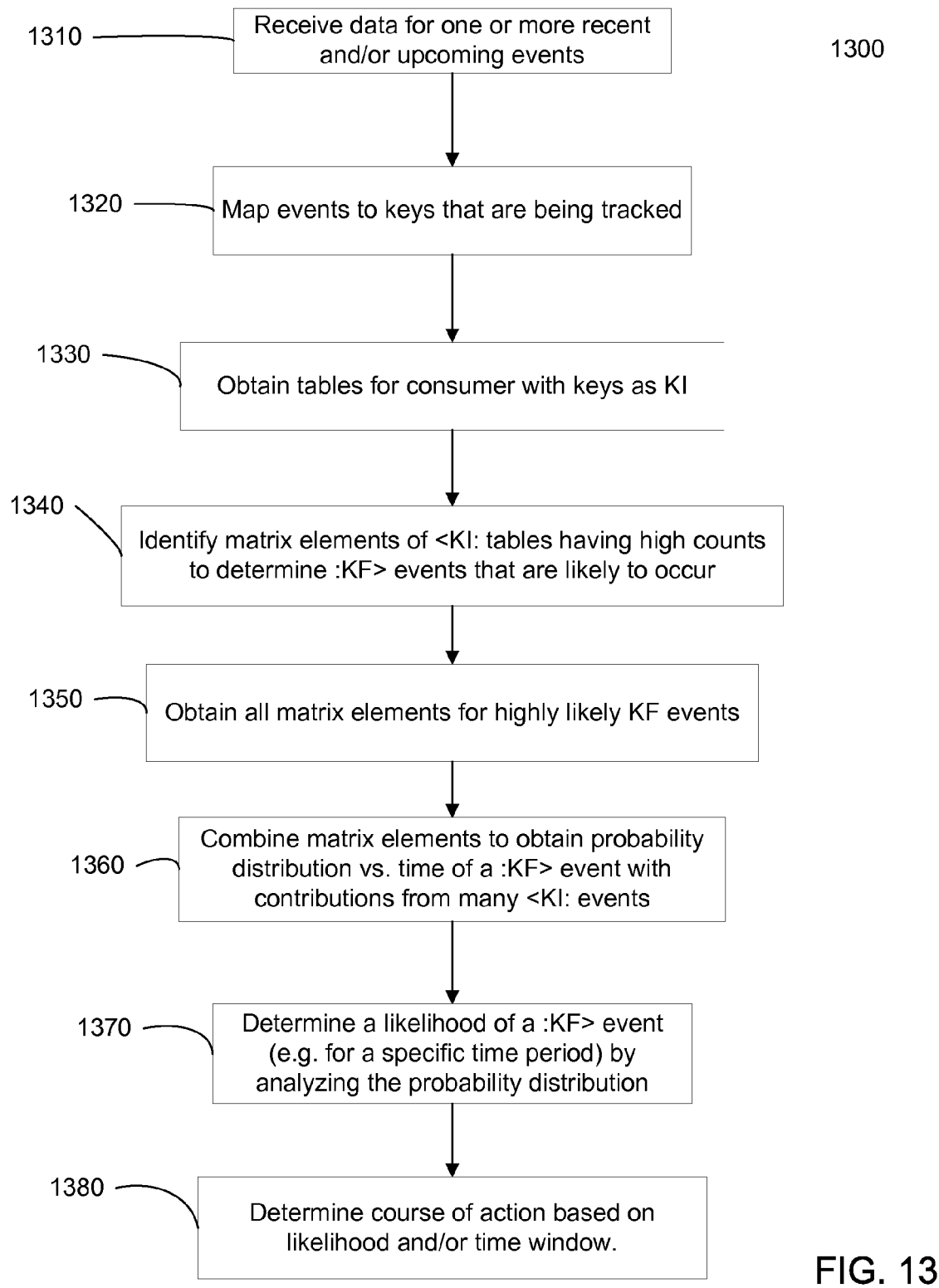
FIG. 13 a flowchart of a method for predicting an event according to embodiments of the present invention.

FIG. 13 a flowchart of a method 1300 for predicting an event according to embodiments. Method 1300 can be performed by any one, plurality, or combination of computer apparatus described herein, and components thereof.

In step 1310, data for one or more recent and/or upcoming events is received. In one embodiment, the event data (e.g. transaction data) is associated with one entity, e.g., a particular consumer or affinity group. For recent events, whether an event is "recent" can be relative to other events. For example, if an event does not occur often, a recent event (e.g. a last event of that type) can still occur a long time ago in absolute terms. For an upcoming event, the event has not occurred yet, but can be known to occur. For example, the start of a month (or other time period) has a known time of occurrence. As another example, a scheduled event (such as a sporting event or concert) can be used. Data for these scheduled events can be obtained before they occur due to the nature of these events.

In step 1320, the event data is used to map each event to one or more keys KI. In some embodiments, the mapped keys KI are specifically keys that are being tracked for an entity. In step 1330, tables of established patterns that have an initial key of KI are obtained, thereby providing <KI: tables relevant to the received event data. In one embodiment, matching and retrieval function 794 of FIG. 7D identifies the relevant tables using methods described herein. In embodiments where an event is an upcoming event, the upcoming event can be a final event (or effectively the time ranges can be negative with the upcoming event being an initial event), where transactions before the ending event are analyzed.

In step 1340, the <KI: tables having matrix elements with sufficiently high counts are identified to determine KF events that are likely to occur. In one embodiment, to determine whether a matrix element has a sufficiently high count, one or more absolute or relative threshold numbers can be used. A relative threshold (e.g. a percentage) could be determined using a total number of counts for a table or group of tables. In another embodiment, all tables (i.e. not just ones with a matching KI for initial key) could be analyzed to find matrix elements with high counts. thereby eliminating steps 1310 to 1330. However, using recent or upcoming events can provide greater timeliness for any result, or action to be performed based on the a result. The identified KF events along with the specific time ranges for the matrix elements with the high counts can then be analyzed.

In other embodiments, the <KI: tables having matrix elements with sufficiently high or low counts can be identified, e.g., to determine KF events that can be part of a trend. The trend may be a change in likelihood, which can be identified when a count is outside of a band of expected or average values. In one embodiment, to determine whether a matrix element has a sufficient count, one or more absolute or relative threshold numbers can be used (e.g. below a lower and above an upper bound). A relative threshold (e.g. a percentage) could be determined using a total number of counts for a table or group of tables. In another embodiment, all tables (i.e. not just ones with a matching KI for initial key) could be analyzed to find matrix elements with high or low counts, thereby eliminating steps 810 to 830. However, using recent or upcoming events can provide greater timeliness for any result, or action to be performed based on a result. The identified KF events along with the specific time ranges for the matrix elements with the high or low counts can then be analyzed.

In step 1350, other matrix elements not previously identified are obtained for each likely KF event. For example, a KF event can be correlated to more initial keys than just the ones identified in step 1320. These previously unanalyzed tables can also have high counts for certain matrix elements involving a KF event. The KF event can be used as a filter to identify unanalyzed tables, from which other high-count matrix elements can be obtained. Thus, this step can be used to obtain a more accurate likelihood for a specific KF event. Obtaining these other high-count matrix elements may not be needed, e.g., if KI is starting event, such as a beginning of a week, month, etc. In this case, since other tables would include the same data points, these other tables would just include redundant information.

Also, low count matrix elements for KF events already determined to be likely can be important if high accuracy is desired. For example, as the timeframes of the different :KF> tables can be different (due to different KI events), matrix elements having relatively low counts can correspond to the same timeframe as a high-count matrix element. Thus, the number of counts for a likely time range can be revised.

In this manner, high probability KF events can be determined based on a few recent or upcoming KI events, and then a full analysis of :KF> tables can be performed, as opposed to randomly selecting KF events to determine when they might be likely to occur. A KF event could be chosen for analysis, but a selected KF event might not be highly likely. However, if one were interested in a specific KF event, then it may be desirable to start method 1300 at step 1350.

In step 1360, the matrix elements (e.g., just from step 1340 or also from step 1350) are combined to obtain a probability distribution vs. time for a :KF> event, which is correlated to many <KI: events. In one embodiment, each of the matrix elements for the KF event are combined from a portion or all of the <KI:KF> tables, where KI runs over the initial events that are correlated to the KF event. This combination can account for the fact that the different KI events occur at different times, and thus the time ranges for each table can be different (e.g. offset).

In one implementation, the earliest or latest KI event can be identified, and offsets for the time ranges of the other tables can be determined. The corresponding matrix elements can then be added using the offsets. If a time range of a matrix element of one table only partially overlaps an offset time range of another table, then the combination can be broken up into more time ranges with proportional contributions from each previous rime range. For example, if two time ranges overlap, then three time sections can result. The overlap section can receive contributions (i.e. a percentage of the counts) from the two matrix elements, with the amount of contribution proportional to the amount of overlap in time for the respective time ranges.

To determine a time range of high likelihood, a probability distribution can be created from the resulting time ranges X after the combination and the counts Y for each time range. The resulting time ranges X with the respective counts Y can be analyzed as a function Y=F(X), which can correspond to pattern 420 of FIG. 4. The Y values can be normalized so that the counts for time ranges of different lengths are accounted. The Y values can also be normalized based on the dollar amount of a transaction.

In step 1370, a total likelihood for a KF event (e.g. across multiple initial events) is calculated. In one embodiment, different likelihoods can be determined for different transaction amounts for the KF event, which can be selected by multiplying with a mask matrix. In another embodiment, the likelihood may be for a specific time window or for the KF event occurring at any future time. A specific time window may correspond to a predetermined time range of a matrix element, or be another time range that results from an overlap of multiple time ranges. For example, if two matrix elements overlap in time (e.g. because the KI events occur at different times), then the time window may have the range of the overlap time.

In other embodiments, a trend can be confirmed for a particular time or time window (e.g. time range of the identified matrix element) by analyzing the probability distribution. In one embodiment, a total likelihood for a KF event can be calculated to confirm that the likelihood is still outside the average or expected band. Likelihood values near the time range can also be examined to identify regions of significant change in probability.

To determine a time range of high likelihood, the probability function F can be analyzed. For example, the function F can be analyzed with a numerical routine to identify a maximum or regions having values above a threshold (or potentially within a range, e.g., using multiple thresholds). To identify maximum regions, techniques such as finite difference, interpolation, finite element, or other suitable methods, can be used to obtain first and second derivatives of F. These derivates can then be used in an optimization algorithm for finding a maximum. Global optimization methods can also be used, such as simulated annealing.

In addition to finding a time window when an event is likely, a total probability over a specific time period can be obtained. In one embodiment, the function F can be integrated (e.g. sum counters for time ranges) over the desired time range. In effect, to obtain a probability that an event will occur within a prescribed time period, one can integrate contributions over all of the relevant key pairs during the time period. As an example with one key pair, a probability that someone will perform a certain event (e.g. a transaction) once they are visiting San Francisco can be obtained by integrating the key pair <SF: KF> over all of the desired time periods. In one aspect, time periods of greater than one month may not be relevant if a person never stays in San Francisco for that long. One could also determine a probability for a transaction to occur in November in a similar way.

As an alternative to all of the above steps, one can select a particular event and a particular time. Then, the time interval from that time to the recent correlated events can provide a set of key pair tables with 1 or other non-zero values in the appropriate matrix elements, much as account tables 1130 can be created. These tables are then multiplied by the long term behavior to obtain the likelihood. Effectively, the prediction can be treated as if the particular event has actually occurred. Besides a particular time, a time window can also be specified, which may cause more than one matrix element in a table to have a non-zero value. In this case, the non-zero values can be based on a level of overlap of the time window with the corresponding time ranges of the matrix elements.

In one embodiment, the currently calculated probability distribution can optionally be compared to other probability distributions calculated previously. In one embodiment, the previously calculated distributions are for the same :KF> event. In this manner, a change in probability at a particular time in one distribution to another can be determined. This change can be used to determine a trend. For example, the change can be plotted and a trend in the change can be determined. The change can be used to predict a trend even when the likelihood values fall within an expected or average band.

Referring back to method 1300, in step 1380, a course of action can be determined based on likelihood and/or time window. Various example actions and determinations are now described. If a likelihood is low, then no action can be taken. If a likelihood is high, then a time window for that high likelihood can be determined. If the time window starts soon, an action that can be performed soon (e.g. sending a coupon via e-mail or text message) can be initiated. Whereas if the time window does not start for an extended period of time, an action that takes longer (e.g. ordering more inventory) can be performed. Examples of actions taking longer include business decisions such as opening or closing a store in a particular zip code, and buying or moving inventory.

Also, once an event is found to be likely, further analysis can be performed to determine whether and how and action is to be performed. For example, a cost of an action, such as the cost of sending a coupon can be determined as part of a cost-benefit analysis. As another example, a cost of an action, such as the cost of moving inventory or discounting the price of a product can be determined as part of a cost-benefit analysis.

In one embodiment, the cost of an action can include a loss due to fraud, which can be calculated using methods described herein, e.g., as described for FIG. 11. In one aspect, if the likelihood of an event is low, then a high cost will not be tolerated (e.g. no action performed). In another aspect, if the likelihood of an event is high (potentially coupled with a high expected profit), then a high cost may be tolerated. Also, if the cost is high, it may be desirable to obtain further information (e.g. about the customer). In another embodiment, a profit of an event can be determined, e.g., the profit from a transaction resulting from an incentive. If the profit is high, then a higher cost and lower likelihood can be tolerated.

In one embodiment, calculations for the prediction of an event can be run in real time (e.g. within several hours after an event or series of events occur). In another embodiment, the calculations can be run as batch jobs that are run periodically, e.g., daily, weekly or monthly. For example, a calculation can run monthly to determine who is likely to buy a house, and then a coupon for art, furniture, etc. can be sent to that person. In various embodiments, prediction of major purchases can generally be run in larger batches, whereas prediction of small purchases can be run in real-time (e.g., in reaction to a specific transaction).

In some embodiments, ending events also can be used similarly to predict what may happen before the event. Since the occurrence of an ending event can be known ahead of time (e.g. scheduled for a particular time), the correlated initial events can still be predicted. For example, consumer activity prior to a schedule sporting event can be determined, which may be done, e.g., using tables having negative time ranges with the ending event as an initial key or with positive time ranges with the ending event as a final key.

XI. Generalization of Calculation

Any of the calculations above can be generalized to a basic framework, which can include contributions from different types of established patterns (potentially from multiple entities), as well as contributions from multiple entities for the short-term tables.

A. One Entity

In some embodiments, the account entity corresponding to a particular consumer is the only entity involved in a calculation. The account entity can be represented as Ga. Ga can refer generally to all of the tables associated with a particular account entity. The notation Ga(mcc,ctry:mcc, ctry) refers to the specific set of tables (and thus a specific type of patterns) where the keys have key elements in categories mcc (merchant code) and ctry (country).

An event is represented with E, which can act as an impulse as described above. The event can be represented with any key elements mentioned herein and be of any type of event (e.g. a transaction or a start of a time period) mentioned herein. In one aspect, the event E can be represented with a key having key elements from the same categories as the specific account object, in this case mcc and ctry.

In some embodiments, the indicia V of account patterns relevant to an event E can be obtained with the formula: $V=E \otimes Ga(mcc,ctry:mcc,ctry)$. The event E can be for a final or an initial event. The symbol $\otimes$ is a filtering operation that selects the relevant tables from a particular object (i.e. set of tables for the account entity).

In one embodiment, the event E can be represented by one or more tables (e.g. similar to tables 1130), and the filtering can be performed by matching (including aligning) and multiplying the tables. In another embodiment, the result of a filtering operation (e.g. the above V) can be matrix elements of one table or multiple tables, e.g., as described for FIGS. 9 and 11. Also, the matrix elements can be summed to provide one number, e.g., if one wanted a total probability to occur during all of the time ranges.

When only specific frequency patterns are desired, a mask matrix can be used, as described herein. An example of a formula obtaining indicia with a mask matrix is $V=E \otimes (Mlow \cdot Ga(mcc,ctry:mcc,ctry))$. Here, Mlow is a low pass filter implemented as a mask matrix, e.g., a matrix having 1s in matrix elements for the desired frequencies and 0s in the other matrix elements. The operator $\cdot$ is an element by element multiplication, which can be performed for each table.

In one embodiment, a combination of events may be used in a calculation. For example, the last five events for the Ga account entity may be used. In simplified notation, this can give the formula: $V=E1 \otimes Ga, E2 \otimes Ga, E3 \otimes Ga, E4 \otimes Ga, E5 \otimes Ga$. Thus, if the last five events were used, five sets of indicia (e.g. 5 tables) could be obtained using the above formula. The previous events could be used to see if potentially fraudulent behavior has recently been seen for the particular account. In another embodiment, the indicia for each event can be combined, thereby still providing only one table.

The formulas above can equally be applied to other entities, such as an affinity group or a merchant. The formulas effectively determine how the impulse events fit the established patterns of the entity. Also, Ga can be linear combination of other entities, e.g., affinity groups, as described above.

B. One Entity with Multiple Types of Patterns

For just one event, there can be multiple types of patterns, each of which can be output as a different set of indicia. One type of pattern can be for when any transaction for a consumer occurs. Other types of patterns can include a pattern of transactions: at a specific store or during a specific time period; from issuer country to acquirer country; from zip codes to other zip codes; from prior mcc to mcc, and in a specific country. Thus, a type of pattern can correspond to a particular combination of categories of key elements for a key pair, e.g., <mcc:mcc> and <zip:zip> can be different types of patterns.

As an event can be associated with many keys and different patterns may exist for different categories of key elements, further symbols can be used to identify a unique representation of E. For example, E(:mcc1,ctry1,merch1) can be an impulse for specific values (mcc1,ctry1,merch1) for the key elements mcc, ctry, and merch (merchant name) in a final key. Accordingly, in an embodiment, the indicia V of account patterns relevant to a final event E can be obtained with the formula:

$V=E(:mcc1,ctry1,merch1) \otimes Ga(*:mcc,ctry,merch),$
$E(:mcc1,ctry1) \otimes Ga(mcc,ctry:mcc,ctry),$
$E(:mcc1,ctry1) \otimes Ga(*:mcc,ctry).$ As shown, there are three sets of indicia (separated by a comma), one set for each filtering operation and each type of pattern. The result of each filter can be matrix elements of one table or multiple tables. The wildcard "*" in Ga(*:mcc,ctry,merch) denotes that this set of tables include any events associated with the entity Ga for the initial event, and not just events with a particular key. As an example, for a final key of (mcc1,ctry1,merch1), the key pair table can track a pattern of (mcc1,ctry1,merch1) events occurring after any event.

C. Multiple Entities with One Type of Pattern

In a calculation of one set of indicia, more than one entity can be used, e.g., as described for FIG. 11 with an account entity and a normalized fraud entity. The normalized fraud entity can be represented as Gt. Thus, in one embodiment, the indicia V of account patterns relevant to a final event E can be obtained with the formula: $V=E(:mcc1,ctry1,merch1) \otimes ((Gt(*:mcc,ctry,merch) \cdot Ga\text{-}st(*:mcc,ctry,merch))$. Here, Ga-st are short term tables for an account entity. In this manner, the recent behavior of the account entity can be checked for fraudulent behavior based on particular final events E.

The inner product operator $\cdot$ is an element-by-element multiplication of matching or aligned tables. In one embodiment, when complex numbers are used, the multiplication is performed by multiplying the real parts by the real parts and imaginary parts by the imaginary parts (i.e. real*real and imaginary*imaginary). A normalization can also occur after the inner product is taken.

In one embodiment, the filter operation can act first on Ga to create a short-term table for an event, for example, as described for tables 1130. The formula can be more efficient and could be written as:

$V=(E(:mcc1,ctry1,merch1) \otimes (Ga\text{-}st(*:mcc,ctry,merch)) \cdot Gt(*:mcc,ctry,merch).$ The other entity can be any other entity, not just a fraud entity. In one embodiment, the other entity is one in which an established pattern is to be compared to Ga-st. Also, Gt or tables for another entity can be created in different ways, e.g., other than the normalizing division operation from FIG. 11. In one aspect, the multiplication of Ga with the tables of the other entity provides a measure of a larger group (e.g. all consumers) to be of a certain type (e.g. fraudsters).

D. Multiple Entities with Multiple Types of Patterns

The concepts above can be combined. Thus, in one embodiment, the indicia V of account patterns relevant to a final event E can be obtained with the formula:

$V=(E(mcc1,ctry1, merch1) \otimes (Ga\text{-}st(*:mcc,ctry, merch)) \cdot Gt(*:mcc,ctry,merch),(E(:mcc1,ctry1)$ $\otimes$ (Ga-st(mcc,ctry:mcc,ctry))·Gt(mcc,ctry:mcc, ctry),(E(:mcc1,ctry1) $\otimes$ (Ga-st(*:mcc,ctry))·Ga (*:mcc,ctry).

Each set of indicia can be calculated independently, and in parallel. Also, the calculation for each set of indicia can use a different Gt, which can be for different entities.

E. Multiple Account Entities

In some embodiments, more than one account entity can be used in a calculation regarding patterns for a particular account entity Ga. A reason for such a combination can be that information about what other consumers do can be useful in investigating the patterns of a particular consumer. For example, what other consumers in the same affinity group or geographic location and be helpful. One other entity is Gh, which can include all of the consumers in the same household as the consumer for account entity Ga, where Gh-st is the recent behavior (e.g. tables of recent transactions) for the household. Other examples include the consumers in the same zip code or on the same street as Ga. These other entities incorporate contributions from these entities as to whether an event fits an established pattern, or is unusual for a particular consumer, merchant, affinity group, etc.

In the following formula, the different representations of impulse events are labeled with short hand. Each impulse notes the account entity and the number within the account entity. Thus, in one embodiment, the indicia V of account patterns relevant to a final event E can be obtained with the formula:

$V=Ea1 \otimes (Gt(*:mcc,\text{ctry,merch}) \cdot (M\text{lowpass} \cdot Ga\text{-st}(*:mcc,\text{ctry,merch})))$, $Ea2 \otimes (Gt(mcc,\text{ctry}:mcc,\text{ctry}) \cdot (M\text{low} \cdot Ga\text{-st}(mcc,\text{ctry}:mcc,\text{ctry})))$, $Ea3 \otimes (Gt(*:mcc,\text{ctry}) \cdot (M\text{low} \cdot Ga\text{-st}(*:mcc,\text{ctry})))$, $Eh1 \otimes (Gt(*:mcc,\text{ctry,merch}) \cdot (Gh\text{-st}(*:mcc,\text{ctry, merch})))$, $Eh2 \otimes (Gt(*:mcc,\text{ctry}) \cdot (Gh\text{-st}(*:mcc,\text{ctry})))$, $Eh3 \otimes (Gt(mcc,\text{ctry}:mcc,\text{ctry}) \cdot (Gh\text{-st}(mcc,\text{ctry}:mcc, \text{ctry})))$.

As mentioned above, the order of operation can vary from that indicated.

Figure 14:
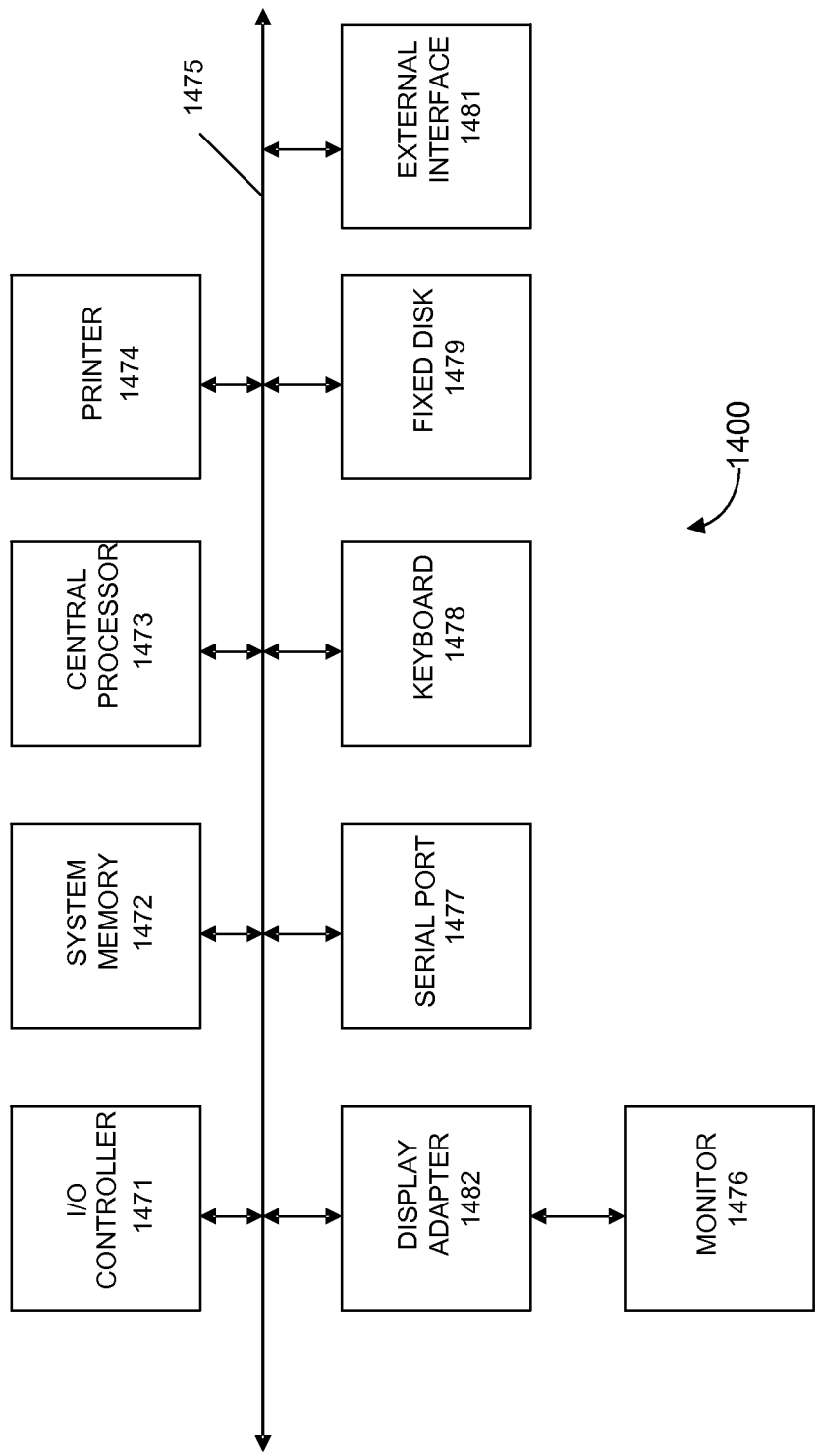
FIG. 14 shows a block diagram of an example computer system usable with systems and methods according to embodiments of the present invention.

Any of the computer systems mentioned herein may utilize any suitable number of subsystems. Examples of such subsystems are shown in FIG. 14 in computer apparatus 1400. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 14 are interconnected via a system bus 1475. Additional subsystems such as a printer 1474, keyboard 1478, fixed disk 1479, monitor 1476, which is coupled to display adapter 1482, and others are shown. Peripherals and input/output (I/O) devices, which couple to I/O controller 1471, can be connected to the computer system by any number of means known in the art, such as serial port 1477. For example, serial port 1477 or external interface 1481 can be used to connect computer system 1400 to a wide area network such as the Internet, a mouse input device, or a scanner. The interconnection via system bus 1475 allows the central processor 1473 to communicate with each subsystem and to control the execution of instructions from system memory 1472 or the fixed disk 1479, as well as the exchange of information between subsystems. The system memory 1472 and/or the fixed disk 1479 may embody a computer readable medium. Any of the values mentioned herein can be output from one component to another component and can be output to the user.

A computer system can include a plurality of the same components or subsystems, e.g., connected together by external interface 1481. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

Other methods of determining risk can be found in U.S. Pat. Nos. 6,018,723; 6,119,103; 6,658,393; and 7,227,950, which are incorporated by reference.

What is claimed is:

1. A method of determining a likelihood of an occurrence of a second transaction involving a consumer, the method comprising:

receiving, by a computer, data associated with first transactions previously performed by the consumer as received from a plurality of access devices associated with a plurality of merchants at a plurality of locations, wherein each transaction of the first transactions involves authorization request and authorization response messages, and clearing and settlement processes, and wherein the first transactions are stored in a transaction database in communication with the computer;

associating, by the computer, one or more keys with each transaction of the first transactions and the second transaction;

determining, by the computer, a plurality of correlated pairs of the first transactions, wherein a correlated pair of first transactions includes an initial transaction associated with an initial key and a final transaction associated with a final key that occurs after the initial transaction;

for each correlated pair of the first transactions, identifying, by the computer, one or more key pairs associated with the correlated pair;

providing, by the computer, a particular set of counters for a particular key pair having a particular initial key and a particular final key, wherein each counter in the particular set of counters is associated with a different time range, wherein the different time ranges do not overlap, wherein the particular set of counters are stored in a local memory of the computer, the local memory storing a plurality of tables of counters, each table corresponding to a different key pair;

after determining the plurality of correlated pairs of the first transactions, for each correlated pair associated with the particular key pair:

determining, by the computer, a respective time interval between the final transaction and the initial transaction of the correlated pair, wherein the respective time interval depends on the correlated pair of first transactions;

selecting, by the computer, a respective counter of the particular set of counters for the particular key pair having a corresponding time range that includes the respective time interval; and increasing, by the computer, the respective counter of the particular set of counters for the particular key pair, wherein each counter in the particular set of counters is increased for each correlated pair having the respective time interval within the corresponding time range; and determining, by the computer, the likelihood of the occurrence of the second transaction involving the consumer by:

querying, by the computer, the plurality of tables stored in the local memory to obtain the particular set of counters of the particular key pair;

determining, by the computer, a second time interval between the second transaction associated with the particular final key of the particular key pair and another transaction associated with the particular initial key of the particular key pair, the other transaction occurring prior to the second transaction;

determining, by the computer, which time range of the different time ranges of the particular set of counters includes the second time interval;

comparing, by the computer, a value of the counter associated with the determined time range with one or more values of one or more other counters of the particular set of counters for the particular key pair; and determining, by the computer, the likelihood of the occurrence in the determined time range of the second transaction involving the consumer based on the comparison, wherein a higher value for the counter associated with the determined time range relative to the one or more other counters indicates a higher likelihood than a lower value for the counter associated with the determined time range relative to the one or more other counters; and when the likelihood is higher than a threshold value, either authorizing the second transaction by sending a communication over a network to a device for authorization or sending an incentive to the consumer based on the queried particular set of counters and the determined time range based on the likelihood.

2. The method of claim 1, wherein the likelihood of the occurrence in the determined time range of the second transaction involving the consumer is a likelihood of the second transaction occurring at a particular time.

3. The method of claim 1, wherein the second transaction is a future transaction that has not occurred.

4. The method of claim 1, further comprising:

for each correlated pair of first transactions, selecting at least one set of the one or more keys that are associated with the correlated pair of first transactions, wherein the plurality of counters include a set of counters for each selected set of the one or more keys.

5. The method of claim 4, wherein each increased counter is also associated with an amount of at least one of the transactions of the correlated pair, and wherein the counters of a set form a table of various amounts and time ranges.

6. The method of claim 4, wherein a key includes at least a portion of the data associated with a first transaction.

7. The method of claim 4, wherein increasing the respective counter of the particular set of counters for the particular key pair includes increasing a counter for each set of counters associated with the particular key pair, wherein each increased counter is associated with the time interval for the particular key pair.

8. The method of claim 4, wherein the counters of a set are associated with various time ranges.

9. The method of claim 8, wherein the various time ranges for each set of counters are predetermined.

10. The method of claim 9, wherein each time range corresponds with a frequency of a periodic function that is used to determine the likelihood of the occurrence in the determined time range of the second transaction involving the consumer.

11. The method of claim 9, wherein the various time ranges increase in length as the time intervals within the various time ranges increase.

12. The method of claim 11, wherein a portion of the counters of a set are respectively associated with time ranges of: zero to 1 minute, between 1 minute and 2.7 minutes, between 2.7 minutes and 7.4 minutes, between 7.4 minutes and 20 minutes, and over 1.2 million minutes.

13. The method of claim 1, further comprising:
determining, by the computer, a sum of values of each counter in the particular set of counters for the particular key pair; and
determining, by the computer, a ratio of the value of the counter associated with the time range that includes the second interval divided by the sum of the values of the particular set of counters for the particular key pair.

14. The method of claim 1, further comprising:
ranking, by the computer, the counters in the particular set of counters for the particular key pair based on the values of each of the counters, wherein a high value for the counter associated with the determined time range relative to the one or more other counters of the particular set of counters indicates a higher likelihood of the occurrence of the second transaction.

15. The method of claim 1, wherein when the likelihood is lower than the threshold value:
selecting another counter of the particular set of counters associated with a different time range from the determined time range, and
comparing the value of the another counter associated with the different time range with the one or more values of the one or more other counters of the particular set of counters for the particular key pair to determine a likelihood of the occurrence in the different time range of the second transaction.

16. The method of claim 1, wherein when the likelihood is lower than the threshold value, sending the incentive to the consumer based on the queried particular set of counters and the determined time range to incentivize the second transaction.

17. A computer system comprising:
one or more processors; and
a computer program product comprising a tangible computer readable medium storing a plurality of instructions for controlling one or more processors to perform a method of determining a likelihood of an occurrence of a second transaction involving a consumer, the method comprising:
receiving data associated with first transactions previously performed by the consumer as received from a plurality of access devices associated with a plurality of merchants at a plurality of locations, wherein the first transactions are stored in a transaction database in communication with the computer system;
associating, one or more keys with each transaction of the first transactions and the second transaction;
determining a plurality of correlated pairs of the first transactions, wherein a correlated pair of first transactions include an initial transaction associated with an initial key and a final transaction associated with a final key that occurs after the initial transaction;
for each correlated pair of the first transactions, identifying one or more key pairs associated with the correlated pair;
providing a particular set of counters for a particular key pair having a particular initial key and a particular final key, wherein each counter in the particular set of counters is associated with a different time range, wherein the different time ranges do not overlap, wherein the particular set of counters are stored in a local memory of the computer, the local memory storing a plurality of tables of counters, each table corresponding to a different key pair;
after determining the plurality of correlated pairs of the first transactions, for each correlated pair associated with the particular key pair:
determining a respective time interval between the final transaction and the initial transaction of the correlated pair, wherein the respective time interval depends on the correlated pair of first transactions;
selecting a respective counter of the particular set of counters for the particular key pair having a corresponding time range that includes the respective time interval; and
increasing the respective counter of the particular set of counters for the particular key pair, wherein each counter in the particular set of counters is increased for each correlated pair having the respective time interval within the corresponding time range; and
determining the likelihood of the occurrence of the second transaction involving the consumer by:
querying the plurality of tables stored in the local memory to obtain the particular set of counters of the particular key pair;
determining a second time interval between the second transaction associated with the particular final key of the particular key pair and another transaction associated with the particular initial key of the particular key pair, the other transaction occurring prior to the second transaction;
determining which time range of the different time ranges of the particular set of counters includes the second time interval;
comparing a value of the counter associated with the determined time range with one or more values of one or more other counters of the particular set of counters for the particular key pair; and
determining the likelihood of the occurrence in the determined time range of the second transaction involving the consumer based on the comparison, wherein a higher value for the counter associated with the determined time range relative to the one or more other counters indicates a higher likelihood than a lower value for the counter associated with the determined time range relative to the one or more other counters; and
when the likelihood is higher than a threshold value, either authorizing the second transaction by sending a communication over a network to a device for authorization or sending an incentive to the consumer based on the queried particular set of counters and the determined time range based on the likelihood.

18. A method of determining a likelihood of an occurrence of a second event involving a consumer, the method comprising:
receiving, by a computer, data of first events associated with the consumer as received from a plurality of access devices associated with a plurality of merchants at a plurality of locations, wherein the first events are stored in a database in communication with the computer;
associating, by the computer, one or more keys with each first event and the second event;
determining, by the computer, a plurality of correlated pairs of the first events, wherein a correlated pair of first events include an initial event associated with an initial key and a final event associated with a final key that occurs after the initial event;

for each correlated pair of the first events, identifying, by the computer, one or more key pairs associated with the correlated pair;

providing, by the computer, a particular set of counters for a particular key pair having a particular initial key and a particular final key, wherein each counter in the particular set of counters is associated with a different time range, wherein the different time ranges do not overlap, wherein the particular set of counters are stored in a local memory of the computer, the local memory storing a plurality of tables of counters, each table corresponding to a different key pair;

after determining the plurality of correlated pairs of the first events, for each correlated pair associated with the particular key pair:

determining, by the computer, a respective time interval between the final event and the initial event of the correlated pair, wherein the respective time interval depends on the correlated pair of first events;

selecting, by the computer, a respective counter of the particular set of counts for the particular key pair having a corresponding time range that includes the respective time interval;

increasing, by the computer, the respective counter of the particular set of counters for the particular key pair, wherein each counter in the particular set of counters is increased for each correlated pair having the respective time interval within the corresponding time range; and determining, by the computer, the likelihood of the occurrence of the second event involving the consumer by:

querying, by the computer, the plurality of tables stored in the local memory to obtain the particular set of counters of the particular key pair;

determining, by the computer, a second time interval between the second event associated with the particular final key of the particular key pair and another event associated with the particular initial key of the particular key pair, the other event occurring prior to the second event;

determining, by the computer, which time range of the different time ranges of the particular set of counters includes the second time interval;

comparing, by the computer, a value of the counter associated with the determined time range with one or more values of one or more other counters of the particular set of counters for the particular key pair; and determining, by the computer, the likelihood of the occurrence in the determined time range of the second event involving the consumer based on the comparison, wherein a higher value for the counter associated with the determined time range relative to the one or more other counters indicates a higher likelihood than a lower value for the counter associated with the determined time range relative to the one or more other counters; and when the likelihood is higher than a threshold value, either authorizing the second event by sending a communication over a network to a device for authorization or sending an incentive to the consumer based on the queried particular set of counters and the determined time range based on the likelihood.

19. The method of claim 18, wherein the second event has already occurred.

20. The method of claim 18, wherein each set of counters is stored in a table associated with a respective key pair.

21. The method of claim 20, wherein the first events are associated with an amount, and wherein the tables have amount ranges on a first axis and time ranges on a second axis.

22. The method of claim 20, wherein each of the key pair tables is associated with an initial key associated with the initial events used to determine the counters of the respective key pair table and a final key associated with the final events used to determine the counters of the respective key pair table.

23. The method of claim 22, further comprising:

identifying a group of the key pairs associated with a first key, wherein the second event is associated with the first key, and wherein identifying the group of the key pairs associated with the first key includes:

identifying a group of one or more key pairs having a final key that matches the first key;

selecting the sets of counters of the identified group of the key pairs; and using the selected sets of counters to determine the likelihood of the occurrence in the determined time range of the second event involving the consumer.

24. The method of claim 23, wherein using the selected sets of counters to determine the likelihood of the occurrence in the determined time range of the second event involving the consumer includes:

for each of the identified group of key pairs:

identifying a third event associated with the initial key of the key pair;

determining a respective time interval between the second event and the third event;

using the respective time interval to identify a counter from the respective set of counters, the identified counter associated with the time range that includes the determined time interval.

25. The method of claim 24, further comprising:

summing the values of the identified counters.

26. The method of claim 23, wherein identifying the group of one or more key pairs having the final key that matches the first key includes:

matching the first key associated with the second event to the final keys of the identified group of key pairs, wherein matching the first key includes aligning the first key by broadening key elements of the first key until a match with the final key is found.

27. The method of claim 22, wherein determining the likelihood of the occurrence of the second event involving the consumer includes:

identifying one or more other keys associated with the second event, the one or more other keys including the first key;

identifying a group of one or more key pairs having an initial key that matches the first key;

selecting the sets of counters of the identified group of key pairs; and using the selected sets of counters to determine the likelihood of the occurrence in the determined time range of the second event involving the consumer.

28. The method of claim 18, wherein at least one of the first events associated with the consumer includes a beginning of a time period.

29. The method of claim 18, wherein at least one of the first events associated with the consumer includes a financial transaction.

30. The method of claim 18, wherein for each identified key pair, time information associated with events for each identified key pair is stored in a transaction history database table.

31. The method of claim 30, wherein one or more patterns of previous events can be determined from the time information for each relevant identified key pair.

32. The method of claim 20, wherein the key pair tables are generated using the keys and time information of the first events.

33. A computer system comprising:
one or more processors; and
a computer program product comprising a tangible computer readable medium storing a plurality of instructions for controlling one or more processors to perform a method of determining a likelihood of an occurrence of a second event involving a consumer, the method comprising:
receiving data of first events associated with the consumer as received from a plurality of access devices associated with a plurality of merchants at a plurality of locations, wherein the first events are stored in a database in communication with the computer system;
associating one or more keys with each first event and the second event,
determining a plurality of correlated pairs of the first events, wherein a correlated pair of first events include an initial event associated with an initial key and a final event associated with a final key that occurs after the initial event;
for each correlated pair of the first events, identifying one or more key pairs associated with the correlated pair;
providing a particular set of counters for a particular key pair having a particular initial key and a particular final key, wherein each counter in the particular set of counters is associated with a different time range, wherein the different time ranges do not overlap, wherein the particular set of counters are stored in a local memory of the computer, the local memory storing a plurality of tables of counters, each table corresponding to a different key pair;
after determining the plurality of correlated pairs of the first events, for each correlated pair associated with the particular key pair:
determining a respective time interval between the final event and the initial event of the correlated pair, wherein the respective time interval depends on the correlated pair of first events;
selecting, by the computer, a respective counter of the particular set of counts for the particular key pair having a corresponding time range that includes the respective time interval;
increasing the respective counter of the particular set of counters for the particular key pair, wherein each counter in the particular set of counters is increased for each correlated pair having the respective time interval within the corresponding time range;
determining the likelihood of the occurrence of the second event involving the consumer by:
querying the plurality of tables stored in the local memory to obtain the particular set of counters of the particular key pair;
determining a second time interval between the second event associated with the particular final key of the particular key pair and another event associated with the particular initial key of the particular key pair, the other event occurring prior to the second event;
determining which time range of the different time ranges of the particular set of counters includes the second time interval;
comparing a value of the counter associated with the determined time range with one or more values of one or more other counters of the particular set of counters for the particular key pair; and
determining the likelihood of the occurrence in the determined time range of the second event involving the consumer based on the comparison, wherein a higher value for the counter associated with the determined time range relative to the one or more other counters indicates a higher likelihood than a lower value for the counter associated with the determined time range relative to the one or more other counters; and
when the likelihood is higher than a threshold value, either authorizing the second event by sending a communication over a network to a device for authorization or sending an incentive to the consumer based on the queried particular set of counters and the determined time range based on the likelihood.

* * * * *